United States Patent [19]

Ataka et al.

[11] Patent Number: 5,443,427
[45] Date of Patent: Aug. 22, 1995

[54] APPARATUS FOR CONTROLLING AUTOMATIC TRANSMISSION

[75] Inventors: Hiroshi Ataka, Asaki; Tsunefumi Niiyama, Kamifukuoka, both of Japan

[73] Assignee: Honda Giken Kogyo Kabushiki Kaisha, Tokyo, Japan

[21] Appl. No.: 80,859

[22] Filed: Jun. 22, 1993

[30] Foreign Application Priority Data

Jun. 23, 1992 [JP] Japan .................................. 4-188572
Apr. 19, 1993 [JP] Japan .................................. 5-115437

[51] Int. Cl.⁶ ........................ B60K 41/18; F16H 61/06
[52] U.S. Cl. ................................ 475/123; 477/148; 477/154
[58] Field of Search ............... 477/125, 148, 149, 154, 477/155; 475/122, 123, 128

[56] References Cited

U.S. PATENT DOCUMENTS

| | | | |
|---|---|---|---|
| 4,527,678 | 7/1985 | Pierce et al. | 477/154 |
| 4,653,351 | 3/1987 | Downs et al. | 477/148 |
| 4,938,102 | 7/1990 | Leising et al. | 477/154 |
| 4,947,329 | 8/1990 | Benford et al. | 364/424.1 |
| 4,951,200 | 8/1990 | Leising et al. | 364/424.4 |
| 5,029,494 | 7/1991 | Lentz et al. | 477/149 |
| 5,038,636 | 8/1991 | Vukovitch et al. | 477/149 |
| 5,113,343 | 5/1992 | Hunter et al. | 477/148 |
| 5,282,401 | 2/1994 | Hebbale et al. | 475/123 |

FOREIGN PATENT DOCUMENTS 62-246653 10/1987 Japan .
1261559 10/1989 Japan .
23770 1/1990 Japan .

Primary Examiner—John J. Vrablik
Attorney, Agent, or Firm—Lyon & Lyon

[57] ABSTRACT

An automatic transmission on an automobile has an input shaft, an output shaft, a plurality of power transmitting paths disposed between the input and output shafts for establishing respective gear positions, and a plurality of engaging elements for selecting one of the power transmitting paths at a time. A shift controller disengages a previous-position engaging element and engages a next-position engaging element to switch from one of the power transmitting paths to another for thereby effecting a shift from a previous gear position to a next gear position. The shift controller provides a plurality of previous-position stages for controlling the previous-position engaging element with respective different characteristics to vary forces to disengage the previous-position engaging element in each of the gear positions, and a plurality of next-position stages for controlling the next-position engaging element with respective different characteristics to vary forces to engage the next-position engaging element in each of the gear positions. The shift controller executes the previous-position stages and the next-position stages to effect a shift between gear positions according to a change in the rotational speed of the input shaft, and executes all or selected ones of the previous-position stages and the next-position stages successively in order.

11 Claims, 13 Drawing Sheets

APPARATUS FOR CONTROLLING AUTOMATIC TRANSMISSION

BACKGROUND OF THE INVENTION

1. Field of the Invention

The present invention relates to an apparatus for controlling speed changes or shifts to be made by an automotive automatic transmission.

2. Description of the Prior Art

Some automatic transmissions for use on automobiles have a plurality of power transmitting gear trains which are selectively switched into operation to effect a speed change or shift by controlling engagement of engaging elements including clutches and brakes. The engagement of engaging elements is automatically controlled by hydraulic actuators to bring about automatic speed changes.

To effect a speed change in an automatic transmission, an engaging element that has been engaged, i.e., a previous-position engaging element, is disengaged, and an engaging element that is to be engaged to achieve a next gear position, i.e., a next-position engaging element, is engaged.

If the previous-position engaging element is disengaged too early, or the next-position engaging element is engaged too late, then there is a moment where any engaging elements are not engaged, causing the engine coupled to the automatic transmission to race. Conversely, if the previous-position engaging element is disengaged too late, or the next-position engaging element is engaged too early, then both the previous- and next-position engaging elements are engaged, resulting in a large speed change or shift shock.

There have heretofore been proposed various control systems for adjusting the timing of disengagement of the previous-position engaging element and engagement of the next-position engaging element to avoid the undesirable engine racing and shift shock.

For example, it has been customary to adjust the timing of engagement of an engaging element with an orifice positioned in a hydraulic passage which supplies working oil pressure to the engaging element, or with a valve which operates depending on the difference between working oil pressures applied to previous- and next-position engaging elements to forcibly lower the working oil pressure applied to the previous-position engaging element when the difference is equal to or higher than a predetermined value.

The timing adjustment with the orifice or the valve depends on the diameter of the orifice, the pressure-bearing area of the valve, and the load of a spring. Therefore, the timing of engagement of an engaging element tends to vary due to manufacturing errors of individual orifices and valves and aging of these orifices and valves.

Japanese laid-open patent publication No. 62-246653 discloses an apparatus for controlling speed changes in an automatic transmission. According to the disclosed apparatus, when a speed change is to be effected, the force applied to engage a previous-position engaging element is controlled in order to equalize the rotational speed of the input shaft of the transmission with a target rotational speed that is a predetermined value higher than the rotational speed of the input shaft immediately prior to the issuance of a command for the speed change, and at the same time the engagement of a next-position engaging element is controlled. When the speed change is effectively started by the engagement of the next-position engaging element, the force applied to engage the next-position engaging element is controlled in order to equalize the rate of change of the rotational speed of the input shaft with a target rate of change.

U.S. Pat. Nos. 4,938,102, 4,947,329, and 4,951,200 disclose speed change control processes for controlling the engagement of engaging elements based on the rotational speed of an engine and the rotational speed of the output shaft of a torque converter.

The disclosed apparatus and processes are free of variations of the timing of engagement of an engaging element due to manufacturing errors and aging of individual parts because the engagement of an engaging element is controlled based on the rotational speed of the engine, the rotational speed of the input shaft of the transmission, and the rotational speed of the output shaft of the torque converter.

According to a speed change control process disclosed in Japanese laid-open patent publication No. 1-261559, the period of operation of an automatic transmission for effecting a speed change is divided into a torque phase and an inertia phase, and feedback and feed-forward control processes are carried out in each of the torque phase and the inertia phase. A transition from the torque phase to the inertia phase is controlled based on a change in the output torque of the transmission.

Japanese laid-open patent publication No. 2-3770 shows another speed change control process in which for a downshift from a third gear position to a second gear position, the torque to engage an engaging means for achieving the third gear position is progressively reduced. When the rate of slippage of the engaging means exceeds a first reference value, the working oil pressure applied to the engaging means is maintained as it is, and when the rate of slippage of an engaging means for achieving the second gear position drops lower than a reference value, this engaging means is engaged thereby effecting the downshift.

In the above speed change control apparatus and processes, for adequate speed change control for each of different speed changes, the start of an effective speed change initiated by the engagement of a next-position engaging element is detected by determining whether or not the rotational speed of the input shaft of the transmission that has been equalized with the target rotational speed by controlling the engagement of a previous-position engaging element has dropped to the rotational speed of the input shaft immediately before the command for the speed change is issued. Theoretically, a smooth speed change is performed if the previous-position engaging element is disengaged and the next-position engaging element starts to be engaged when the rotational speed of the input shaft is equalized with the rotational speed of the input shaft immediately prior to the issuance of the command for the speed change.

Actually, however, a certain time delay or lag is unavoidable from the issuance of the command for a speed change to an actual change in oil pressure which causes the engaging element to operate. Therefore, the control process for disengaging the previous-position engaging element and engaging next-position engaging element is delayed if it is effected when the rotational speed of the input shaft of the transmission has dropped to the rotational speed of the input shaft immediately before the command for the speed change is issued. Consequently, the disclosed speed change control apparatus and processes suffer delayed disengagement of a previous-position engaging element and abrupt engagement of a next-position engaging element, thus impairing the feeling that the driver has upon speed changes.

Furthermore, as described above, when a speed change command is issued, the force applied to engage a previous-position engaging element is controlled in order to equalize the rotational speed of the input shaft of the transmission with a target rotational speed that is a predetermined value higher than the rotational speed of the input shaft immediately prior to the issuance of the speed change command, and when the speed change is effectively started by the engagement of a next-position engaging element, the force applied to engage the next-position engaging element is controlled. This control procedure is suitable for an upshift to be carried out while the engine is accelerated (power-on) by the depression of an accelerator pedal, but cannot be lied upon for a kickdown, i.e., a downshift to be carried out while the engine is accelerated.

After an upshift, the rotational speed of the input shaft of the transmission is lowered as long as the speed of the automobile remains the same. During the upshift, when the previous-position engaging element is disengaged, the rotational speed of the input shaft driven by the engine tends to rise because the engine is accelerated. To prevent the rotational speed of the input shaft from increasing away from the rotational speed thereof after the upshift, it is necessary to control the engagement of the previous-position engaging element to keep the rotational speed of the input shaft at a predetermined speed as described above.

After a kickdown, however, the rotational speed of the input shaft of the -transmission increases as long as the speed of the automobile remains the same. During the kick-down, it is preferable for a smooth and delay-free speed change to increase the rotational speed of the input shaft, rather than keeping it at the predetermined speed, and to engage the next-position engaging element when the rotational speed of the input shaft has increased up to a rotational speed corresponding to the speed reduction ratio at the next gear position.

SUMMARY OF THE INVENTION

It is therefore an object of the present invention to provide an apparatus for controlling speed changes or shifts to be made by an automotive automatic transmission to effect smooth upshifts and downshifts without delay while an engine coupled to the transmission is being either accelerated or decelerated.

According to the present invention, there is provided an apparatus for controlling an automatic transmission on an automobile having drive road wheels, comprising an input shaft for receiving drive power from an engine, an output shaft for transmitting drive power to the drive road wheels of the automobile, a plurality of power transmitting paths disposed between the input and output shafts for establishing respective gear positions, a plurality of engaging elements for selecting one of the power transmitting paths at a time, and engaging control means for controlling forces applied to engage the engaging elements, the engaging control means comprising means for disengaging a previous-position engaging element of-the engaging elements and engaging a next-position engaging element thereof to switch from one of the power transmitting paths to another for thereby effecting a shift from a previous gear position to a next gear position, the engaging control means comprising means for providing a plurality of previous-position stages for controlling the previous-position engaging element with respective different characteristics to vary forces to disengage the previous-position engaging element in each of the gear positions, and a plurality of next-position stages for controlling the next-position engaging element with respective different characteristics to vary forces to engage the next-position engaging element in each of the gear positions, the engaging control means comprising means for executing the previous-position stages and the next-position stages to effect a shift between gear positions according to a change in the rotational speed of the input shaft, and the engaging control means comprising means for executing all or selected ones of the previous-position stages and the next-position stages successively in order.

The previous-position stages and the next-position stages are provided in a first group of combinations in which previous- and next-position stages are allowed to be executed simultaneously and in a second group of combinations in which previous- and next-position stages are inhibited from being executed simultaneously, the controller means comprising means for executing the previous-position stages and the next-position stages concurrently in-the first group of combinations to effect a shift from a previous gear position to a next gear position.

The engaging control means comprises means for providing a first group of previous-position stages and a first group of next-position stages for an upshift and a second group of previous-position stages different from the first group of previous-position stages and a second group of next-position stages different from the first group of next-position stages for a downshift.

The engaging control means comprises means responsive to a command to effect an upshift from the previous gear position to the next gear position, for executing a previous-position stage to lower an oil pressure applied to engage the previous-position engaging element at a predetermine rate after elapse of a predetermined period of time, simultaneously executing a next-position stage to keep an oil pressure ready for immediately engaging the next-position engaging element, and executing next previous- and next-position stages when the rotational speed of the input shaft reaches a threshold value $NU1'$ which is a predetermined rotational speed higher than an upshift reference rotational speed $NU0$ corresponding to the speed of the automobile at the time the previous-position engaging element is engaged, to control the oil pressure applied to engage the previous-position engaging element through a feedback loop to equalize the rotational speed of the input shaft with a first upshift target rotational speed $NU1$ higher than the threshold value $NU1'$ and simultaneously to gradually increase an oil pressure applied to engage the next-position engaging element.

The engaging control means comprises means responsive to a command to effect a downshift from the previous gear position to the next gear position, for executing a previous-position stage to control a force applied to engage the previous-position engaging element to equalize the rotational speed of the input shaft with a first downshift target rotational speed $ND1$ higher than a downshift reference rotational speed $ND0$ corresponding to the speed of the automobile at the time the next-position engaging element is engaged, simultaneously executing a next-position stage to gradually increase a force applied to engage the next-position engaging element, lowering the force applied to the previous-position engaging element when the rotational speed of the input shaft becomes equal to or lower than a second downshift target rotational speed ND2 (ND0<ND2<ND1) which is higher than the downshift reference rotational speed ND0 and lower than the first downshift target rotational speed ND1, and executing next previous- and next-position stages when the rotational speed of the input shaft becomes equal to or lower than a third downshift target rotational speed ND3 (ND0<ND3 <ND2) which is higher than the downshift reference rotational speed ND0 and lower than the second downshift target rotational speed ND2, to minimize the force applied to engage the previous-position engaging element and maximize the force applied to engage the next-position engaging element.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
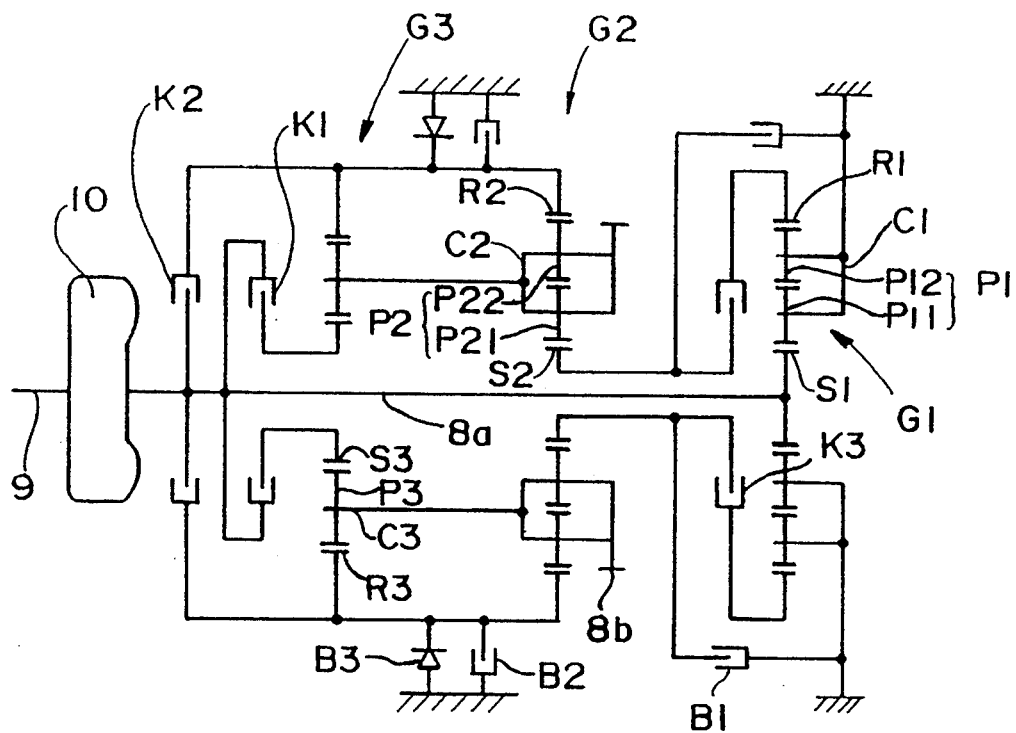
FIG. 1 is a diagram showing a skeleton of the power transmitting system of an automatic transmission which is controlled by a speed change control apparatus according to the present invention.

FIG. 1 schematically shows the power transmitting system of an automatic transmission which incorporates a speed change control apparatus according to the present invention. The automatic transmission is mounted on an automobile (not shown).

The automatic transmission shown in FIG. 1 comprises a torque converter 10 coupled to an engine output shaft 9 of the engine mounted on the automobile, and a transmission mechanism having a transmission input shaft 8a connected to the turbine of the torque converter 10.

The transmission mechanism has first, second, and third planetary gear trains G1, G2, G3 disposed in juxtaposed relationship on the transmission input shaft 8a. The planetary gear trains G1, G2, G3 have respective first, second, and third sun gears S1, S2, S3 positioned centrally, respective first, second, and third planet pinions P1, P2, P3 meshing with the first, second, and third sun gears S1, S2, S3, respectively, and revolvable around the first, second, and third sun gears S1, S2, S3 while rotating about their own axes, respective first, second, and third carriers C1, C2, C3 on which the first, second, and third planet pinions P1, P2, P3 are rotatably supported, and rotatable in unison with the first, second, and third planet pinions P1, P2, P3 as they revolve around the first, second, and third sun gears S2, S3, respectively, and respective first, second, and third ring gears R1, R2, R3 comprising internal gears meshing with the first, second, and third planet pinions P1, P2, P3, respectively.

Each of the first and second planetary gear trains G1, G2 comprises a double-pinion planetary gear train. The first planet pinion P1 comprises pinion gears P11, P12, and the second planet pinion P2 comprises pinion gears P21, P22. The third planetary gear train G3 comprises a single-pinion planetary gear train.

The first sun gear S1 is fixedly coupled to the input shaft 8a, and the first carrier C1 is fixed against rotation at all times. The first ring gear R1 is disconnectably connected to the second sun gear S2 through a third clutch K3. The second sun gear S2 can be fixed against rotation by a first brake B1. The second carrier C2 is directly coupled to the third carrier C3, and also to an output gear 8b. Therefore, rotation of the second and third carriers C2, C3 is transmitted from the output gear 8b as output rotation of the transmission mechanism. The second ring gear R2 is directly coupled to the third ring gear R3. The second and third ring gears R2, R3 can be fixed against rotation by a second brake B2. The second and third ring gears R2, R3 are disconnectably connected to the transmission input shaft 8a by a second clutch K2. The third sun gear S3 is disconnectably connected to the transmission input shaft 8a through a first clutch K1. The second and third ring gears R2, R3 can also be braked by a one-way brake B3 parallel to the second brake B2.

The first, second, and third clutches K1, K2, K3, and the first and second brakes B1, B2 are controlled, i.e., engaged and disengaged, to establish gear positions and control gear shifts or speed changes. Specifically, when the first, second, and third clutches K1, K2, K3, and the first and second brakes B1, B2 are engaged and disengaged as shown in Table 1 below, the transmission mechanism can establish five forward gear positions (1ST, 2ND, 3RD, 4TH, and 5TH) and a single reverse gear position (REV). Speed reductions ratios in the respective gear positions, which vary depending on the numbers of teeth of the gears, are also given by way of example.

TABLE 1

| Gear Position | K1 | K2 | K3 | B1 | B2 | Ratio |
| --- | --- | --- | --- | --- | --- | --- |
| 1ST | O | | | | (O) | 3.577 |
| 2ND | O | | | | O | 2.100 |
| 3RD | O | | O | | | 1.400 |
| 4TH | O | O | | | | 1.000 |
| 5TH | | O | O | | | 0.711 |
| REV | | | O | | O | 2.953 |

In Table 1, those clutches and brakes which are marked with "O" are engaged. The second brake B2 is marked with "(O)" in the 1ST gear position because power from the engine can be transmitted through the one-way brake B3 even if the second brake B2 is not engaged. Specifically, when the first clutch K1 is engaged, power from the engine can be transmitted at the speed reduction ratio of the 1ST gear position and the 1ST gear position is established even if the second brake B2 is not engaged. However, since power from the road to the engine cannot be transmitted, an engine brake cannot be applied in the 1ST gear position when the second brake b2 is not engaged, and an engine brake can be applied in the 1ST gear position when the second brake b2 is engaged.

Figure 2:
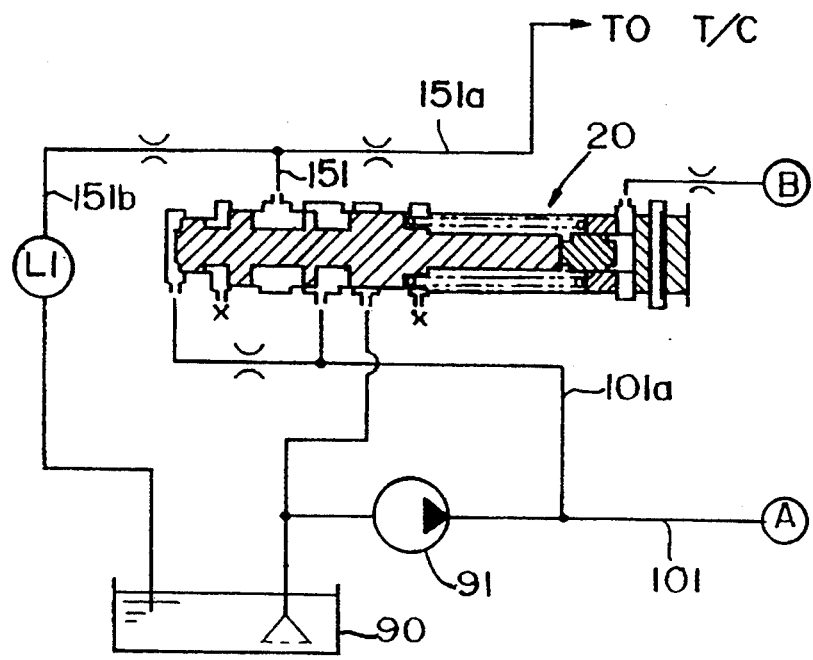
FIG. 2 is a circuit diagram of a hydraulic circuit of the speed change control apparatus.
Figure 3:
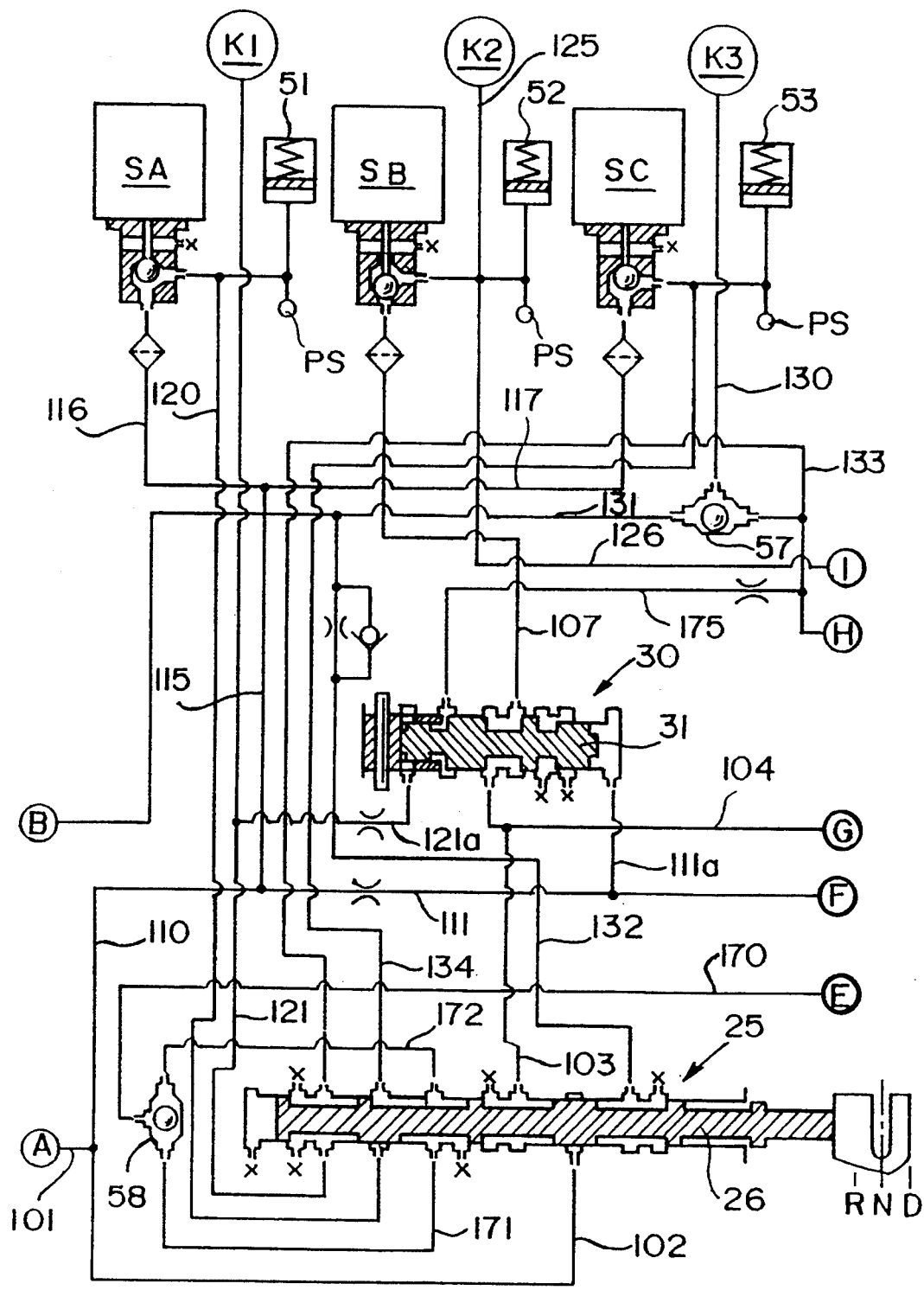
FIG. 3 is a circuit diagram of the hydraulic circuit of the speed change control apparatus.
Figure 4:
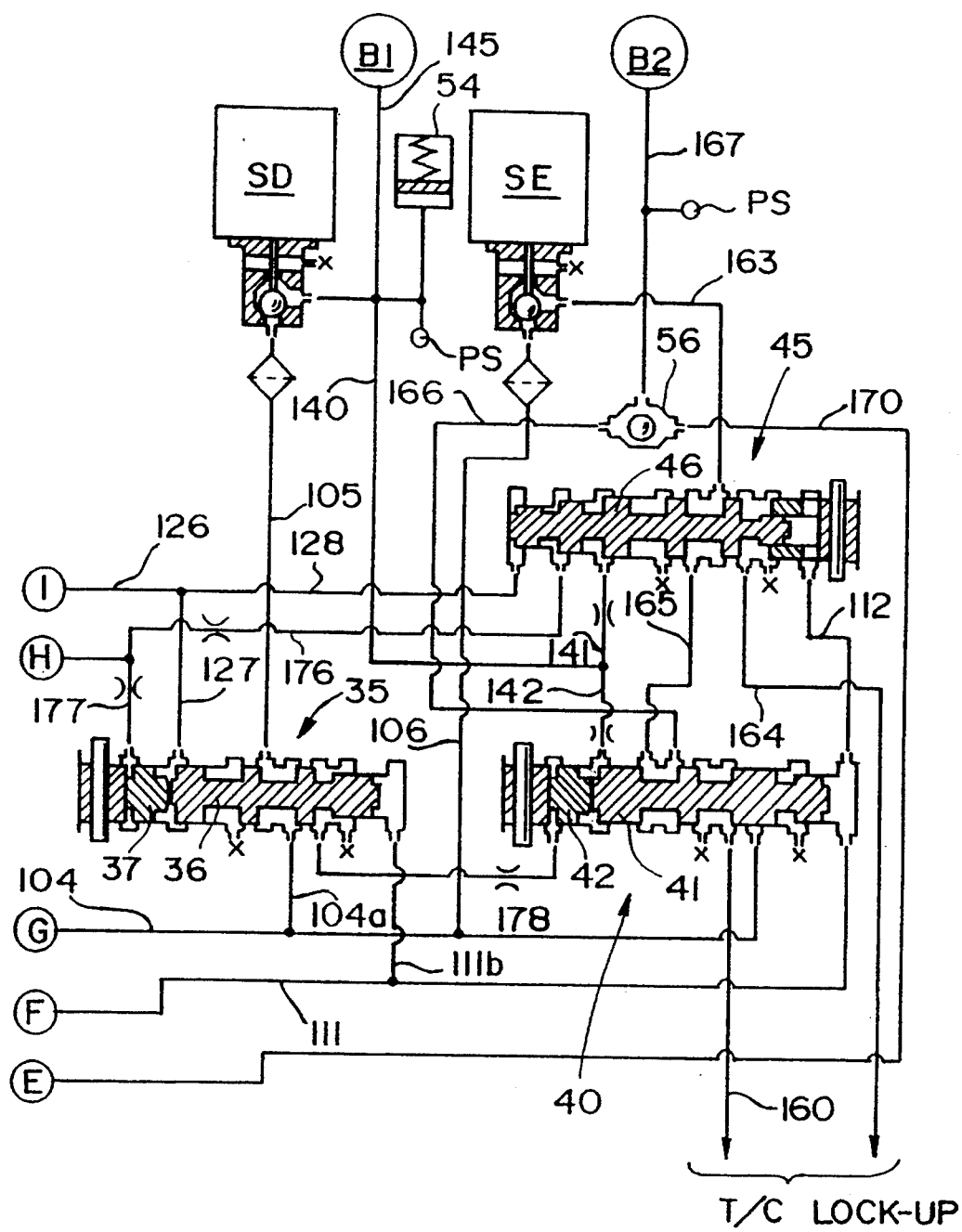
FIG. 4 is a circuit diagram of the hydraulic circuit of the speed change control apparatus.

The control apparatus for controlling engagement and disengagement of the first, second, and third clutches K1, K2, K3, and the first and second brakes B1, B2 will be described below with reference to FIGS. 2 through 4. FIGS. 2 through 4 show different sections of the control apparatus, and jointly represent the control apparatus in its entirety.

In FIGS. 2 through 4, hydraulic passages with ends marked with alphabetical letters A through I enclosed by a circle are connected to hydraulic passages with ends marked with identical alphabetical letters A through I enclosed by a circle. Ports marked with "X" are connected to drain.

The first, second, and third clutches K1, K2, K3, and the first and second brakes B1, B2 are controlled in operation by the pressure of working oil supplied from an oil tank 90 by an oil pump 91. The working oil supplied by the oil pump 91 to an oil passage 101 is applied through an oil passage 101a to a regulator valve 20 by which the pressure is regulated to a predetermined line pressure P1. Part of the working oil is then supplied from the regulator valve 20 under the line pressure P1 to the oil passage 101 (see FIG. 3).

The remaining working oil is supplied from the regulator valve 20 to an oil passage 151. The working oil supplied to the oil passage 151 flows into oil passages 151a, 151b. The working oil flowing into the oil passage 151a is supplied to a torque converter (not shown), and the working oil flowing into the oil passage 151b is supplied to a first lubricated mechanism L1. After having lubricated the first lubricated mechanism L1, the working oil flows back to the oil tank 90.

The working oil in the oil passage 101, whose pressure has been regulated to the line pressure P1, is supplied to various components shown in FIGS. 3 and 4 for controlling speed changes or gear shifts to be made by the automatic transmission.

The control apparatus as shown in FIGS. 3 and 4 includes a manual valve 25 which is manually operable by the driver of the automobile is connected to the shift lever at the driver's seat, five solenoid-operated valves SA, SB, SC, SD, SE, four hydraulically operated valves 30, 35, 40, 45, four accumulators 51, 52, 53, 54, and five oil pressure sensors PS. The solenoid-operated valves SA, SC are normally-open solenoid-operated valves, and are open when their solenoids are turned off. The solenoid-operated valves SB, SD, SE are normally-closed solenoid-operated valves, and are closed when their solenoids are turned off.

The valve 30 will be referred to as a first pressure relief valve, the valve 35 as a second pressure relief valve, the valve 40 as a brake relief valve, and the valve 45 as a switching valve.

Depending on the operation of the manual valve 25 and the solenoid-operated valves SA through SE, the valves 30, 35, 40, 35 are actuated to control speed changes or gear shifts and also operation of a lock-up clutch of the torque converter.

The relationship between the operation of the solenoid-operated valves SA through SE and the gear positions established as these valves operate is shown in Table 2 below. In Table 2, "ON" and "OFF" represent the turning-on and turning-off, respectively, of the solenoids of the solenoid-operated valves SA through SE. While the solenoid-operated valves SA through SE are indicated as being selectively turned on and off in Table 2, each of the solenoid-operated valves SA through SE comprises a duty-cycle-controlled solenoid valve, and its duty cycle is controlled to achieve a desired speed-change or gear-shift characteristic upon a speed change.

TABLE 2

| GEAR POSITION | SOLENOID | | | | |
| --- | --- | --- | --- | --- | --- |
| | SA | SB | SC | SD | SE |
| 1ST | OFF | OFF | ON | OFF | OFF * |
| 2ND | OFF | OFF | ON | ON | OFF ** |
| 3RD | OFF | OFF | OFF | OFF | OFF ** |
| 4TH | OFF | ON | ON | OFF | OFF ** |
| 5TH | ON | ON | OFF | OFF | OFF ** |
| REV | OFF | OFF | OFF | OFF | OFF |

* ON when an engine brake is applied.
** ON when the torque converter is locked up.

The process of establishing the gear positions with the solenoid-operated valves SA, SB, SC, SD, SE according to Table 2 will be described below.

It is assumed that a D (drive) range is selected by the shift lever with a spool 26 of the manual valve 25 being shifted to a position D corresponding to the D range. In FIG. 3, since the spool 26 has been in a position N corresponding to an N (neutral) range, a hook on the right-hand end of the spool 26 is moved to the right into a position indicated by D, whereupon the spool 26 is brought into the position D. When the spool 26 is moved to the position D, an oil passage 102 branched from the oil passage 101 communicates with an oil passage 103, which is thus supplied with the working oil under the line pressure P1.

The working oil under the line pressure P1 is also supplied to an oil passage 110 branched from the oil passage 101, the oil passage 110 being branched into oil passages 115, 111. The oil passage 115 is branched into an oil passage 116 connected to the solenoid-operated valve SA and an oil passage 117 connected to the solenoid-operated valve SC. Therefore, the line pressure P1 is applied to the solenoid-operated valves SA, SC at all times. The oil passage 111 is also branched into oil passages 111a, 111b which are connected to right-hand ends, respectively, of the first and second pressure relief valves 30, 35. The oil passage 111 is connected to a right-hand end of the brake relief valve 40, and also through an oil passage 112 to a right-hand end of the switching valve 45.

Therefore, these valves 30, 35, 40, 45 have respective spools 31, 36, 41, 46 that are normally urged to move to the left under the line pressure P1. The valves 35, 40 have additional spools 37, 42 on the left-hand ends of the spools 36, 41, respectively.

When the D range is selected, a gear position is determined in the D range depending on the load on the engine and the speed of the automobile. Operation of the solenoid-operated valves SA through SE is controlled to achieve the determined gear position as shown in Table 2 above.

The clutches and the brakes are actuated by the solenoid-operated valves in each of the gear positions as follows:

It is assumed that the 1ST gear position is to be established. In the 1ST gear position, the solenoid of the solenoid-operated valve SC is turned on, and the solenoids of the other four solenoid-operated valves are turned off. At this time, only the solenoid-operated valve SA is open, and the other solenoid-operated valves are closed. In the 1ST gear position, the solenoid-operated valve SE is employed to control an engine brake. That is, the solenoid of the solenoid-operated valve SE is turned on in order to apply an engine brake.

Since the line pressure P1 is applied through the oil passage 116 to the solenoid-operated valve SA, the working oil flows under the line pressure P1 through the solenoid-operated valve SA into an oil passage 120. The oil passage 120, which is connected to the manual valve 25, is brought into communication with an oil passage 121 connected to the first clutch K1 when the manual valve 25 is in the position D. Thus, the working oil under the line pressure P1 is supplied through the oil passage 121 to the first clutch K1, which is engaged. The first accumulator 51 and one of the oil pressure sensors PS are connected to the oil passage 120.

The line pressure P1 also acts on a left-hand end of the first pressure relief valve 30 through an oil passage 121a connected to the oil passage 121. Since the oil pressure acting through the oil passage 111a on the first pressure relief valve 30 is larger than the oil pressure acting through the oil passage 121a because of different pressure-bearing areas of the right-hand and left-hand ends of the first pressure relief valve 30, the first pressure relief valve 30 has its spool 31 shifted to the left as shown in FIG. 3.

An oil passage 125 connected to the second clutch K2 is connected to the solenoid-operated valve SB, and also the second accumulator 52 and one of the oil pressure sensors PS. The oil passage 125 is also connected to an oil passage 126 that is connected through oil passages 127, 128 to the second pressure relief valve 35 and the switching valve 45, respectively. Inasmuch as the solenoid-operated valve SB is closed, the oil passage 125 is connected to drain through the solenoid-operated valve SB, and hence the second clutch K2 is disengaged.

The third accumulator 53 and one of the oil pressure sensors PS are connected to the solenoid-operated valve SC. The third clutch K3 is connected to an oil passage 130, which in turn is connected through a shuttle valve 57 selectively to an oil passage 131 or 133. The oil passage 131 is connected through an oil passage 132 to the manual valve 25. When the manual valve 25 is in the position D, the oil passage 132 is connected to drain. The oil passage 133 is also connected to the manual valve 25. When the manual valve 25 is in the position D, the oil passage 132 is connected to an oil passage 134, which is connected to the solenoid-operated valve SC. Since the solenoid of the solenoid-operated valve SC is turned on, the oil passage 134 is connected to drain through the solenoid-operated valve SC. Therefore, the third clutch K3 is disengaged.

The first brake B1 is connected to an oil passage 145 that is connected to the solenoid-operated valve SD, the fourth accumulator 54, one of the oil pressure sensors PS, and an oil passage 140. Since the solenoid-operated valve SD is closed, the oil passage 140 is drained through the solenoid-operated valve SD, thereby disengaging the first brake B1.

The second brake B2 is connected to an oil passage 167 that is connected to one of the oil pressure sensors PS and also through a shuttle valve 56 selectively to an oil passage 166 or 170. The oil passage 167 is connected to the solenoid-operated valve SE successively through the brake relief valve 40, an oil passage 165, the switching valve 45, and an oil passage 163. Therefore, the second brake B2 can be engaged under the control of the solenoid-operated valve SE to control the application of an engine brake in the 1ST gear position.

Thus, the application of an engine brake can be controlled by controlling the operation of the solenoid-operated valve SE in the 1ST gear position.

The oil passage 170 is connected through a shuttle valve 58 selectively to an oil passage 171 or 172. Both the oil passages 171, 172 are connected to drain through the manual valve 25.

Now, it is assumed that the 2ND gear position is to be established. To achieve the 2ND gear position from the 1ST gear position, only the solenoid of the solenoid-operated valve SD is switched from the turned-off state to the turned-on state, opening the solenoid-operated valve SD. The first clutch K1 remains engaged.

When the solenoid-operated valve SD is opened, the working oil under the line pressure P1 is supplied through the oil passage 102, the manual valve 25, the oil passage 103, an oil passage 104, an oil passage 104a, the second pressure relief valve 35, an oil passage 105, the solenoid-operated valve SD, and the oil passage 145 to the first brake B1, engaging the first brake B1. Therefore, the first clutch K1 and the first brake B1 are engaged thereby to establish the 2ND gear position.

With the solenoid-operated valve SD being open, the working oil under the line pressure P1 also acts on the brake relief valve 40 and the switching valve 45 through the oil passage 140 and oil passages 141, 142, causing the brake relief valve 40 and the switching valve 45 to shift their respective spools 41, 46 to the right. While the line pressure P1 also acts on the right-hand ends of the spools 41, 46, the spools 41, 46 are moved to the right because of different pressure-bearing areas on the right-hand and left-hand ends of the spools 41, 46.

The rightward movement of the spools 41, 46 cuts off the communication between the solenoid-operated valve SE and the second brake B2 which have been connected to each other in the 1ST gear position, and connects the oil passage 166 connected to the second brake B2 to drain through the brake relief valve 40. Therefore, the second brake B2 is disengaged at all times in the 2ND gear position.

To shift the transmission from the 2ND gear position to the 3RD gear position, the solenoids of the solenoid-operated valves SC, SD are turned off, and hence the solenoids of all the solenoid-operated valves SA, SB, SC, SD, SE are turned off. From the 2ND gear position, the solenoid-operated valve SC is opened, and the solenoid-operated valve SD is closed. Since the solenoid-operated valve SA is open, the first clutch K1 remains engaged.

When the solenoid-operated valve SD is closed, no oil pressure is supplied to the oil passage 145, which is drained through the solenoid-operated valve SD. Therefore, the first brake B1 is disengaged. At the same time, the oil pressure that has been applied through the oil passages 140, 141, 142 to the brake relief valve 40 and the switching valve 45 is eliminated, releasing the spools 41, 46 of these valves 40, 45.

When the solenoid-operated valve SC is opened, the working oil is supplied under the line pressure P1 to the oil passage 134. Since the oil passage 134 is connected to the oil passage 133 through the manual valve 25, the working oil is supplied under the line pressure P1 through the shuttle valve 57 to the third clutch K3, which is then engaged.

Therefore, the first and third clutches K1, K3 are engaged to establish the 3RD gear position.

Now, the transmission is to be shifted from the 3RD gear position to the 4TH gear position. From the 3RD gear position, the solenoids of the solenoid-operated valves SB, SC are turned on. The solenoid-operated valve SB is opened, and the solenoid-operated valve SC is closed. As the solenoid-operated valve SA has been open, the first clutch K1 remains engaged.

When the solenoid-operated valve SC is closed, the supply of the line pressure P1 to the third clutch K3 is cut off, disengaging the third clutch K3. Simultaneously, the supply of the line pressure P1 through oil passages 175, 176, 177 to the left-hand ends of the first and second pressure relief valves 30, 35 and the switching valve 45 is cut off, and the supply of the line pressure P1 through the oil passage 104a and an oil passage 178 to the brake relief valve 40 is cut off.

The spool 31 of the first pressure relief valve 30 is moved to the left as shown in FIG. 3, allowing the working pressure under the line pressure P1 to flow from the oil passage 103 through the first pressure relief valve 30 to an oil passage 107, from which the working oil is supplied under line pressure P1 through the solenoid-operated valve SB through the oil passage 125 to the second clutch K2, which is now engaged.

The first clutch K1 and the second clutch K2 are thus engaged to establish the 4TH gear position.

To effect a shift from the 4TH gear position to the 5TH gear position, the solenoid of the solenoid-operated valve SA is turned on, and the solenoid of the solenoid-operated valve SC is turned off. Therefore, from the 4TH gear position, the solenoid-operated valve SA is closed, and the solenoid-operated valve SC is opened.

When the solenoid-operated valve SA is closed, the supply of the line pressure P1 through the oil passages 120, 121 is cut off, disengaging the first clutch K1.

The oil pressure supplied to the oil passage 121a is also eliminated, so that the spool 31 of the first pressure relief valve 30 remains shifted to the left. Since the solenoid of the solenoid-operated valve SB remains turned on, the second clutch K2 remains engaged.

When the solenoid-operated valve SC is opened, the working oil is supplied under the line pressure P1 to the oil passage 134, and then through the manual valve 25 and the oil passages 133, 130 to the third clutch K3, which is engaged.

In this manner, the second clutch K2 and the third clutch K3 are thus engaged to establish the 5TH gear position.

In controlling the speed changes or shifts in the D range, the working oil supplied from the oil passage 104 through an oil passage 106 to the solenoid-operated valve SE and controlled by the solenoid-operated valve SE is supplied through the switching valve 45 and the brake relief valve 40 to the second brake B2 in the 1ST gear position (low gear position). However, in the 2ND through 5TH gear positions (medium and high gear positions), the working oil controlled by the solenoid-operated valve SE is supplied through oil passages 160, 164 to the torque converter to control the operation of the lock-up clutch of the torque converter.

Therefore, when the 1ST gear position is established, the solenoid-operated valve SE is used to control the operation of the second brake B2, and when any one of the 2ND through 5TH gear positions is established, the solenoid-operated valve SE is used to control the operation of the lock-up clutch of the torque converter.

When the N range is selected, the clutches K1, K2, K3 and the brakes B1, B2 are connected to drain through the manual valve 25, and hence are disengaged to bring the transmission into a neutral condition.

It is now assumed that the a R (reverse) range is selected by the shift lever. The spool 26 of the manual valve 25 is moved to the left, supplying the working oil under the line pressure P1 from the oil passage 102 to the oil passage 132. The solenoids of the all the solenoid-operated valves SA, SB, SC, SD, SE are turned off.

The oil passage 121 connected to the first clutch K1 is drained by the manual valve 25, disengaging the first clutch K1. The oil passage 125 connected to the second clutch K2 is drained by the solenoid-operated valve SB, disengaging the second clutch K2.

Since the oil passage 130 connected to the third clutch K3 is connected to the oil passage 132 through the shuttle valve 57 and the oil passage 131, the working oil supplied under the line pressure P1 to the oil passage 132 is supplied to the third clutch K3, engaging third clutch K3.

The oil passage 145 connected to the first brake B1 is drained by the solenoid-operated valve SD, disengaging the first brake B1.

The oil passage 167 connected to the second brake B2 is connected through the shuttle valve 56, the oil passage 170, and the shuttle valve 58 selectively to the oil passage 171 or 172. The oil passage 171 is connected through the manual valve 25 and the oil passage 120 to the solenoid-operated valve SA, and the oil passage 172 is connected through the manual valve 25 and the oil passage 134 to the solenoid-operated valve SC. Since the solenoid-operated valves SA, SC are of the normally-open type, the working oil flows under the line pressure P1 into the oil passages 171, 172, engaging the second brake B2.

The third clutch K3 and the second brake B2 are thus engaged to establish the reverse gear position.

As described above, the gear positions can selectively be established by controlling the engagement of the clutches K1, K2, K3 and the brakes B1, B2, i.e., engaging elements, as shown in Table 1, and these engaging elements can be engaged by controlling the operation of the solenoid-operated valves SA, SB, SC, SD, SE as shown in Table 2.

Figure 5:
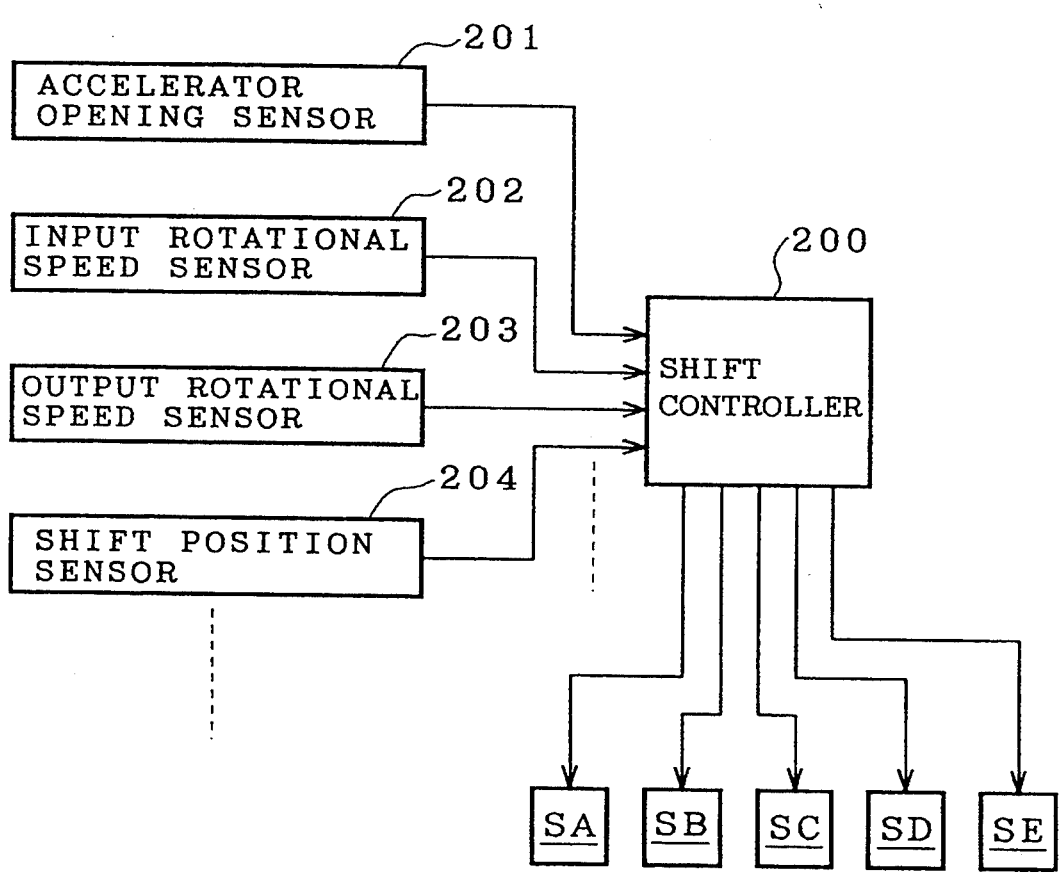
FIG. 5 is a block diagram of the speed change control apparatus.

The control of speed changes or shifts in the automatic transmission is achieved by controlling the operation of the solenoid-operated valves SA, SB, SC, SD, SE with a speed change or shift controller 200 (see FIG. 5) which applies operation signals to the solenoid-operated valves SA, SB, SC, SD, SE. To the shift controller 200, there are connected an accelerator opening sensor 201 for detecting the amount of depression of the accelerator pedal (accelerator opening) of the automobile, an input rotational speed sensor 202 for detecting the rotational speed of the input shaft of the automatic transmission or the rotational speed of the turbine shaft of the torque converter, an output rotational speed sensor 203 for detecting the speed of the automobile or the rotational speed of the output shaft of the automatic transmission, and a shift position sensor 204 for detecting the selected position of the shift lever. Based on detected signals applied from these sensors, the shift controller 200 decides on a speed change or shift to be made, and applies operation signals or speed change or shift commands to the solenoid-operated valves SA, SB, SC, SD, SE to achieve the speed change or shift.

Operation of the speed change control apparatus for controlling speed changes or shifts will be described below.

As shown in Table 1 above, each of the gear positions is established by engaging two of the engaging elements, i.e., the clutches K1, K2, K3 and the brakes B1, B2. Specifically, a shift between two adjacent gear positions is achieved by disengaging one of the two engaging elements and engaging another new engaging element. The engaging element (clutch or brake) that is disengaged is referred to as a previous-position engaging element, and the engaging element that is to be newly engaged is referred to as a next-position engaging element.

Figure 6:
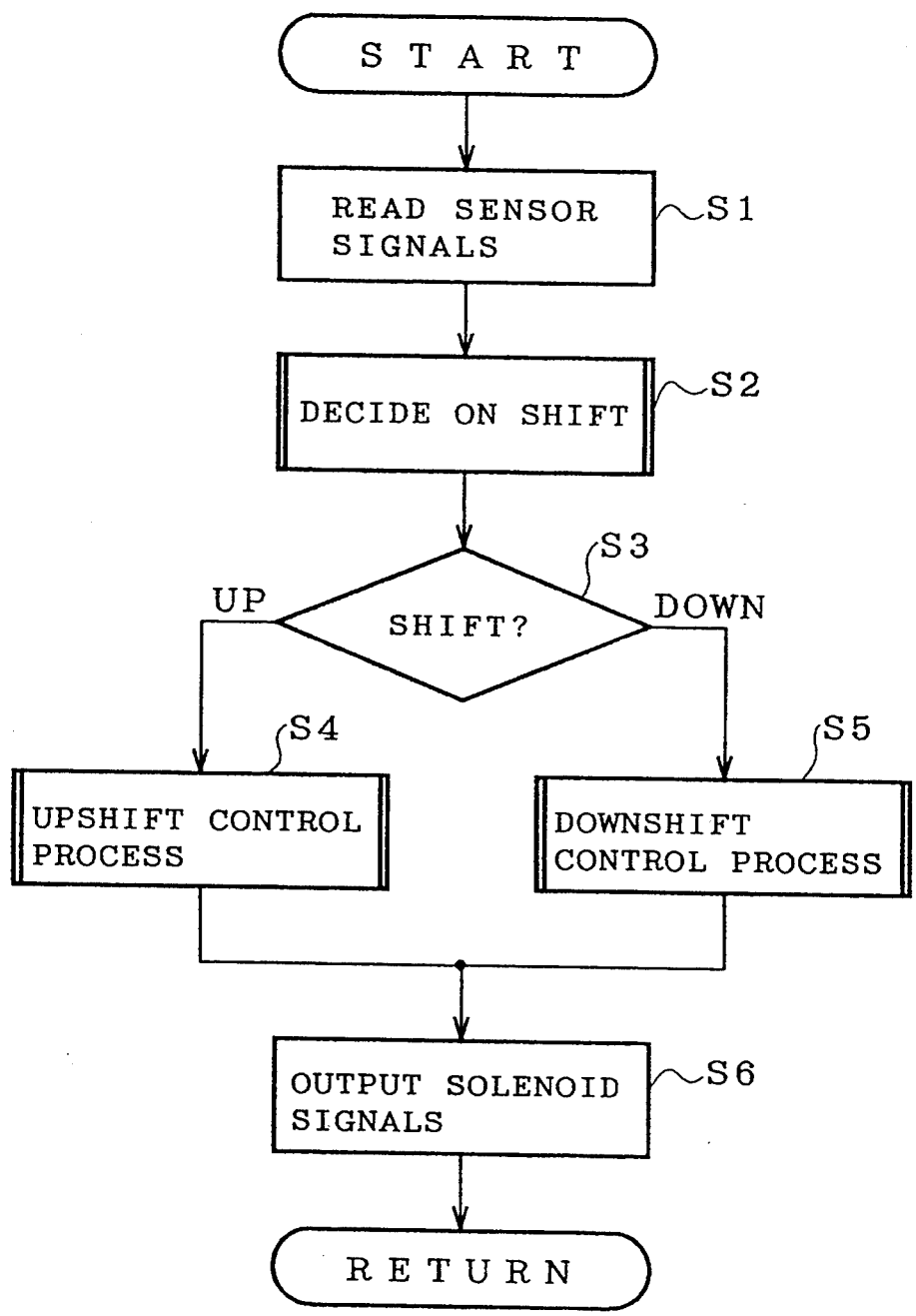
FIG. 6 is a flowchart of a speed change control sequence effected by the speed change control apparatus.

A sequence of operation of the speed change control apparatus for controlling speed changes or shifts is carried out as shown in FIG. 6. First, the shift controller 200 reads detected signals from the various sensors in a step S1, then decides on a speed change or shift to be made in a step S2, and determines whether the shift to be made is an upshift or a downshift in a step S3. If an upshift, then the shift controller 200 executes an upshift control process in a step S4. If a downshift, then the shift controller 200 executes a downshift control process in a step S5. Thereafter, the shift controller 200 outputs operation signals or shift commands to corresponding solenoid-operated valves in a step S6 effect an actual speed change or shift.

Figure 7:
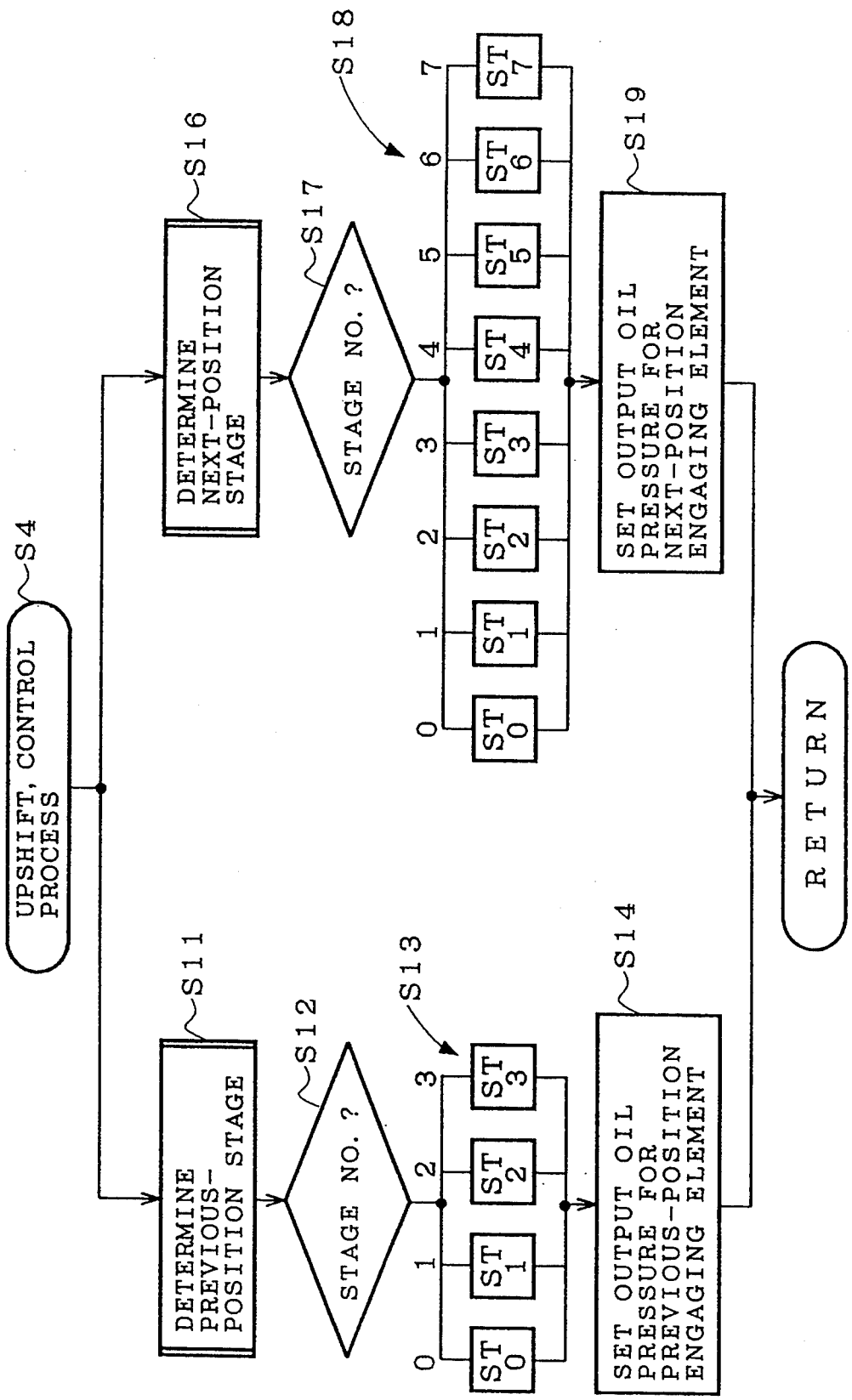
FIG. 7 is a flowchart of an upshift control process of the speed change control sequence shown in FIG. 6.

The upshift control process in the step S4 will first be described below with reference to FIG. 7.

An upshift is performed by disengaging a previous-position engaging element and engaging a next-position engaging element. In the upshift control process, a previous-position engaging element is disengaged and a next-position engaging element is engaged concurrently. For such concurrent control, the shift controller 200 determines a stage for disengaging the previous-position engaging element in a step S11, and also determines a stage for engaging the next-position engaging element in a step S16. Depending on the numbers of the stages determined for disengaging the previous-position engaging element and engaging the next-position engaging element, the shift controller 200 sets output oil pressures for the respective stages thereby to set an output oil pressure for disengaging the previous-position engaging element and also an output oil pressure for engaging the next-position engaging element in steps S12, S13, S14, S17, S18, S19.

The stages are shown in Tables 3 and 4 given below.

TABLE 3

|  | Stages for the previous-position engaging element | Stages for the next-position engaging element |
| --- | --- | --- |
| ST0 | Standby (max. oil pressure) | Standby (min. oil pressure) |
| ST1 | Torque reduced (oil pressure lowered) | Clearance reduced |
| ST2 | OWC controlled | Disengaged upon double engagement |
| ST3 | Disengaged (min. oil pressure) | Clearance maintained |
| ST4 | — | Torque increased (oil pressure increased) |
| ST5 | — | Inertia phase |
| ST6 | — | Shock dampened |
| ST7 | — | Engaged (max. oil pressure) |

TABLE 4

| Next | Previous | | | |
| --- | --- | --- | --- | --- |
|  | 0 | 1 | 2 | 3 |
| ST0 | O | O | X | X |
| ST1 | O | O | O | X |
| ST2 | O | O | X | X |
| ST3 | O | O | X | X |
| ST4 | X | X | O | X |
| ST5 | X | X | X | O |
| ST6 | X | X | X | O |
| ST7 | X | X | X | O |

Table 3 shows the details of the respective stages, and Table 4 shows combinations that are possible among the stages. The mark O in Table 4 indicates a combination of stages that can occur at the same time or whose execution is permitted for controlling the previous-position engaging element and the next-position engaging element, and the mark X in Table 4 indicates a combination of stages that cannot occur at the same time or whose simultaneous execution is inhibited.

For controlling each of the previous-position engaging element and the next-position engaging element in establishing a gear position, the stages are executed successively in numerical order, but not backwards. Depending on the type of a speed change or shift, some stages may be skipped or certain stages are selected for controlling the speed change. In such a case, the selected stages are executed also successively in numerical order.

Setting output oil pressures in the respective stages in an engine-accelerated (power-on) upshift mode will be described below with reference to FIG. 11.

Figure 11:
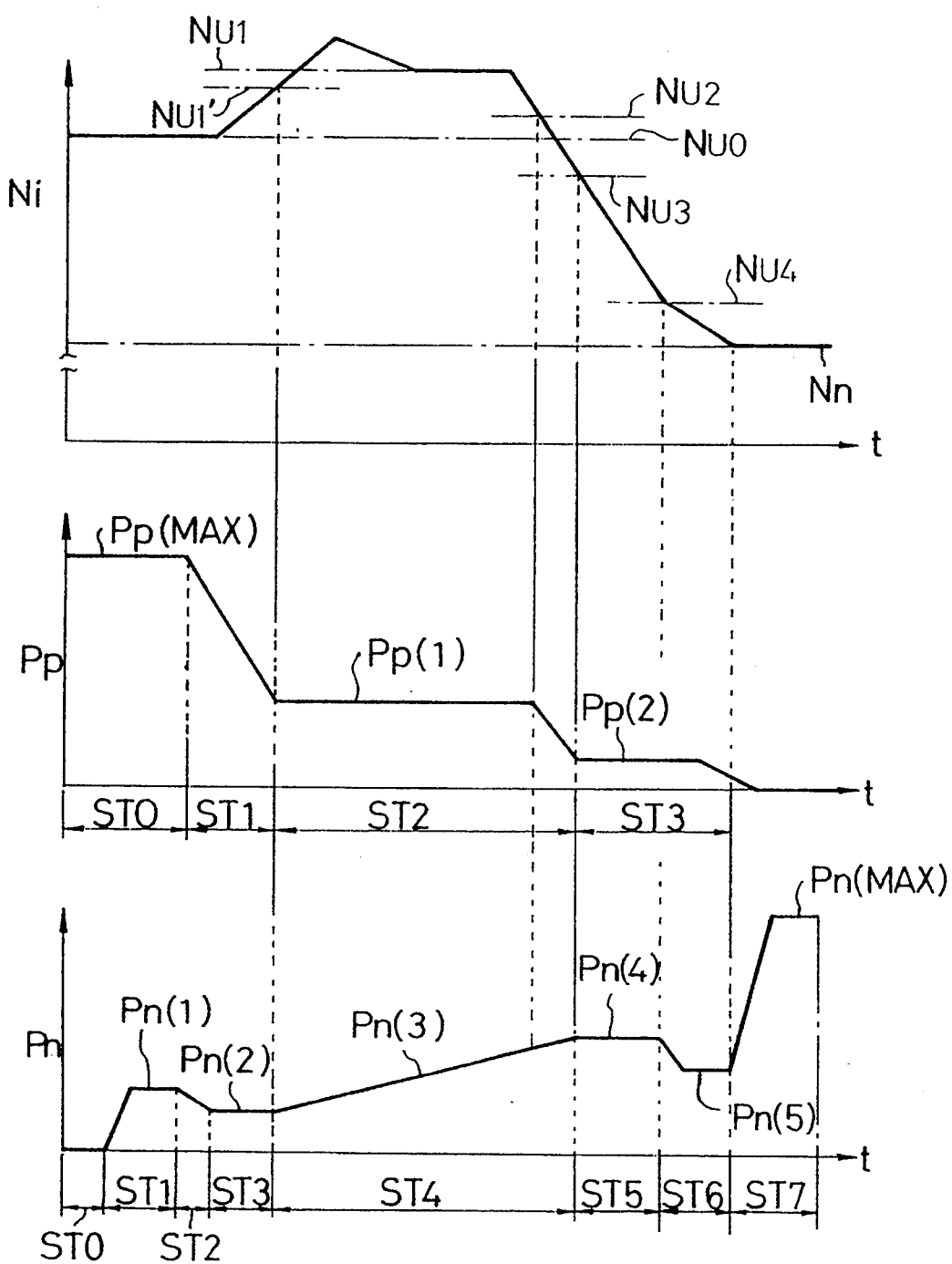
FIG. 11 is a graph showing the rotational speed of the input shaft of the transmission, the working oil pressure applied to a previous-position engaging element, and the working oil pressure applied to a next-position engaging element as they vary with time in an engine-accelerated (power-on) upshift mode.

FIG. 11 shows the rotational speed Ni of the input shaft of the transmission, the working oil pressure Pp applied to engage a previous-position engaging element, and the working oil pressure Pn applied to engage a next-position engaging element as they vary with time in the engine-accelerated upshift mode. When an upshift command is issued, the working oil pressures Pp, Pn applied to the respective previous- and next-position engaging elements enter the stage ST0. Since the stage ST0 is a standby stage, the working oil pressures Pp, Pn remain unchanged for -the period of time corresponding to the stage ST0.

After the stage ST0, the working oil pressure Pp applied to the previous-position engaging element drops at a predetermined rate in the stage ST1. The force exerted to engage the previous-position engaging element starts to be reduced. When the force exerted to engage the previous-position engaging element drops below a value corresponding to the engine torque transmitted to the transmission input shaft, the previous-position engaging element begins to slip. The input shaft rotational speed Ni which corresponds to the automobile speed at the time the previous-position engaging element is engaged is referred to as an upshift reference rotational speed NU0.

Since the engine is accelerated at this time, the input shaft rotational speed Ni starts increasing. When the input shaft rotational speed Ni reaches a threshold value NU1' which is higher than the upshift reference rotational speed NU0 by a predetermined rotational speed of 30 RPM, the control process enters the stage ST2 in which the force exerted to engage the previous-position engaging element is controlled in a feedback loop in order to equalize the input shaft rotational speed Ni with a first upshift target rotational speed NU1 that is higher than the upshift reference rotational speed NU0 by a first predetermined rotational speed of 40 RPM. Under this feedback control, the working oil pressure Pp applied to engage the previous-position engaging element is set to an oil pressure Pp(1) which fluctuates due to the feedback control though it is shown as linear in FIG. 11.

At the same time, the working oil pressure Pn applied to engage the next-position engaging element is also controlled. After the stage ST0, the working oil pressure Pn is set to an oil pressure Pn(1) required to reduce the clearance in the next-position engaging element in the stage ST1. Upon application of the oil pressure Pn(1), a piston of the next-position engaging element is moved a distance corresponding to the clearance of a friction plate or the like, so that the next-position engaging element is readied for immediate engagement. If the oil pressure Pn(1) is so high at this time that the next-position engaging element will start to be engaged, both the previous- and next-position engaging elements would be engaged, thus lowering the input shaft rotational speed Ni. In the event that the oil pressure Pn(1) is too high, therefore, the control process enters the stage ST2 to slightly lower the oil pressure Pn, and the oil pressure Pn is set to an oil pressure Pn(2) to reduce the clearance in the stage ST3.

At the same time that the working oil pressure applied to the previous-position engaging element enters the stage ST2, the working oil pressure applied to the next-position engaging element enters the stage ST4 in which it is gradually increased as an oil pressure Pn(3). During this time, the previous-position engaging element is controlled in a feedback loop in order to keep the input shaft rotational speed Ni at the first upshift target rotational speed NU1. As the oil pressure Pn(3) applied to the next-position engaging element is gradually increased, the force applied to engage the next-position engaging element is also increased, lowering the input shaft rotational speed Ni.

When the input shaft rotational speed Ni becomes lower than a second upshift target rotational speed NU2 (NU2 <NU1) which is higher than the upshift reference rotational speed NU0 by a second predetermined rotational speed of 20 RPM, the working oil pressure Pp applied to engage the previous-position engaging element falls to an oil pressure Pp(2). Now, the control process enters the stage ST3. The previous-position engaging element is substantially disengaged.

The stage ST2 for controlling the previous-position engaging element is similar to a control sequence for controlling an engaging element having a one-way clutch, and hence is referred to as a one-way clutch (OWC) control sequence. The one-way clutch control sequence will now be described below with reference to FIGS. 8 through 10.

Figure 8:
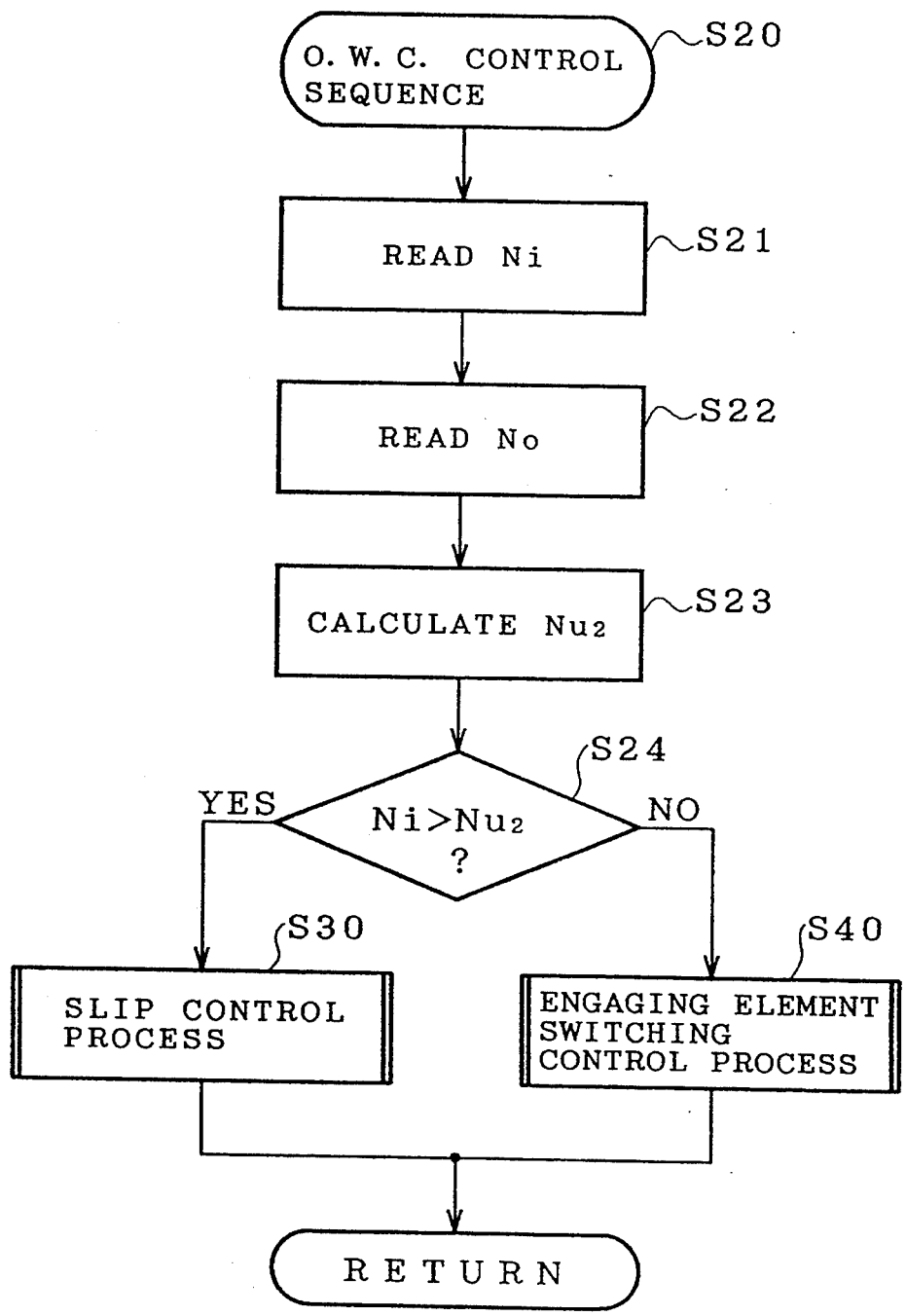
FIG. 8 is a flowchart of a one-way clutch control sequence effected by the speed change control apparatus.

In FIG. 8, the shift controller 200 reads the rotational speed Ni of the input shaft of the automatic transmission in a step S21 and the rotational speed No of the output shaft of the automatic transmission in a step S22. Then, the shift controller 200 calculates the second upshift target rotational speed NU2 in a step S23. If the input shaft rotational speed Ni is higher than the second upshift target rotational speed NU2 in a step S24, then a slip control process is carried out in a feedback loop to equalize the input shaft rotational speed Ni with the first upshift target rotational speed NU2 in a step S30. Conversely, if the input shaft rotational speed Ni is lower than the second upshift target rotational speed NU2 in a step S24, then an engaging element switching control process is carried out to lower the oil pressure applied to the previous-position engaging element in a step S40.

Figure 9:
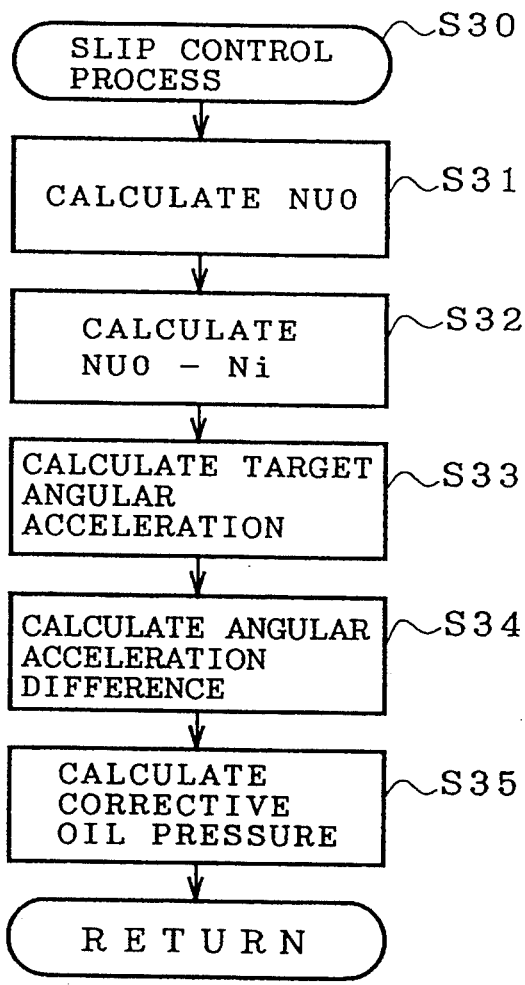
FIG. 9 is a flowchart of a slip control process of the one-way clutch control sequence shown in FIG. 8.

In the slip control process in the step S30 shown in FIG. 9, the shift controller 200 calculates the upshift reference rotational speed NU0 in a step S31, calculates the difference between the upshift reference rotational speed NU0 and the actual input shaft rotational speed Ni in a step S32, and calculates a target angular acceleration for the input shaft rotational speed Ni in a step S33. The target angular acceleration is an acceleration for making the actual input shaft rotational speed Ni closer to the upshift reference rotational speed NU0, and is greater as the difference between the upshift reference rotational speed NU0 and the actual input shaft rotational speed Ni is greater. Then, the shift controller 200 calculates the difference between the target angular acceleration and the actual angular acceleration of the input shaft rotational speed in a step S34, and then calculates a corrective oil pressure to be applied to the previous-position engaging element so as to achieve the target angular acceleration in a step S35. Based on the calculated corrective oil pressure, the shift controller 200 outputs a solenoid operation signal in the step S6 (see FIG. 6) to equalize the input shaft rotational speed Ni with the first upshift target rotational speed NU1.

Figure 10:
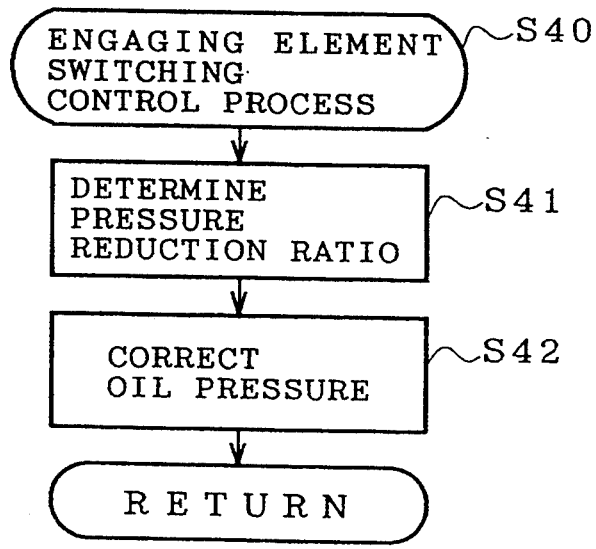
FIG. 10 is a flowchart of an engaging element switching control process of the one-way clutch control sequence shown in FIG. 8.

The engaging element switching control process in the step S40 shown in FIG. 10 is started at the same time that the next-position engaging element starts being engaged, and is a control process for smooth switching from the disengagement of the previous-position engaging element to the engagement of the next-position engaging element. In the engaging element switching control process, the shift controller 200 establishes a rate of reduction for the oil pressure applied to the previous-position engaging element in a step S41, and then corrects the oil pressure applied to the previous-position engaging element to achieve the established rate of reduction in a step S42.

Since the next-position engaging element has started to be engaged at the start of the engaging element switching control process, the input shaft rotational speed Ni is continuously reduced. When the input shaft rotational speed Ni drops to a third upshift target rotational speed NU3 which is lower than the upshift reference rotational speed NU0 by a third predetermined rotational speed of 20 RPM, increasing the oil pressure Pn(3) applied to engage the next-position engaging element is stopped, and the control process enters the stage ST5 in which the working oil pressure Pn is maintained at an oil pressure Pn(4) which is equal to the final value of the oil pressure Pn(3). The input shaft rotational speed Ni then falls at a predetermined rate. When the input shaft rotational speed Ni fails to a rotational speed NU4 that is a predetermined rotational speed of 30 RPM higher than a rotational speed Nn corresponding to the automobile speed at the time the next-position engaging element is engaged, the control process enters the stage ST6 in which the working oil pressure Pn applied to engage the next-position engaging element is reduced to an oil pressure Pn(5), thus reducing the rate at which the input shaft rotational speed Ni falls. In this manner, the engagement of the next-position engaging element is smoothly completed.

When the input shaft rotational speed Ni coincides with the rotational speed Nn, the working oil pressure applied to the next-position engaging element is increased up to a maximum oil pressure Pn(MAX). Now, the engine-accelerated upshift mode is ended.

Setting output oil pressures in the respective stages in an engine-decelerated (power-off) upshift mode will be described below with reference to FIG. 12.

Figure 12:
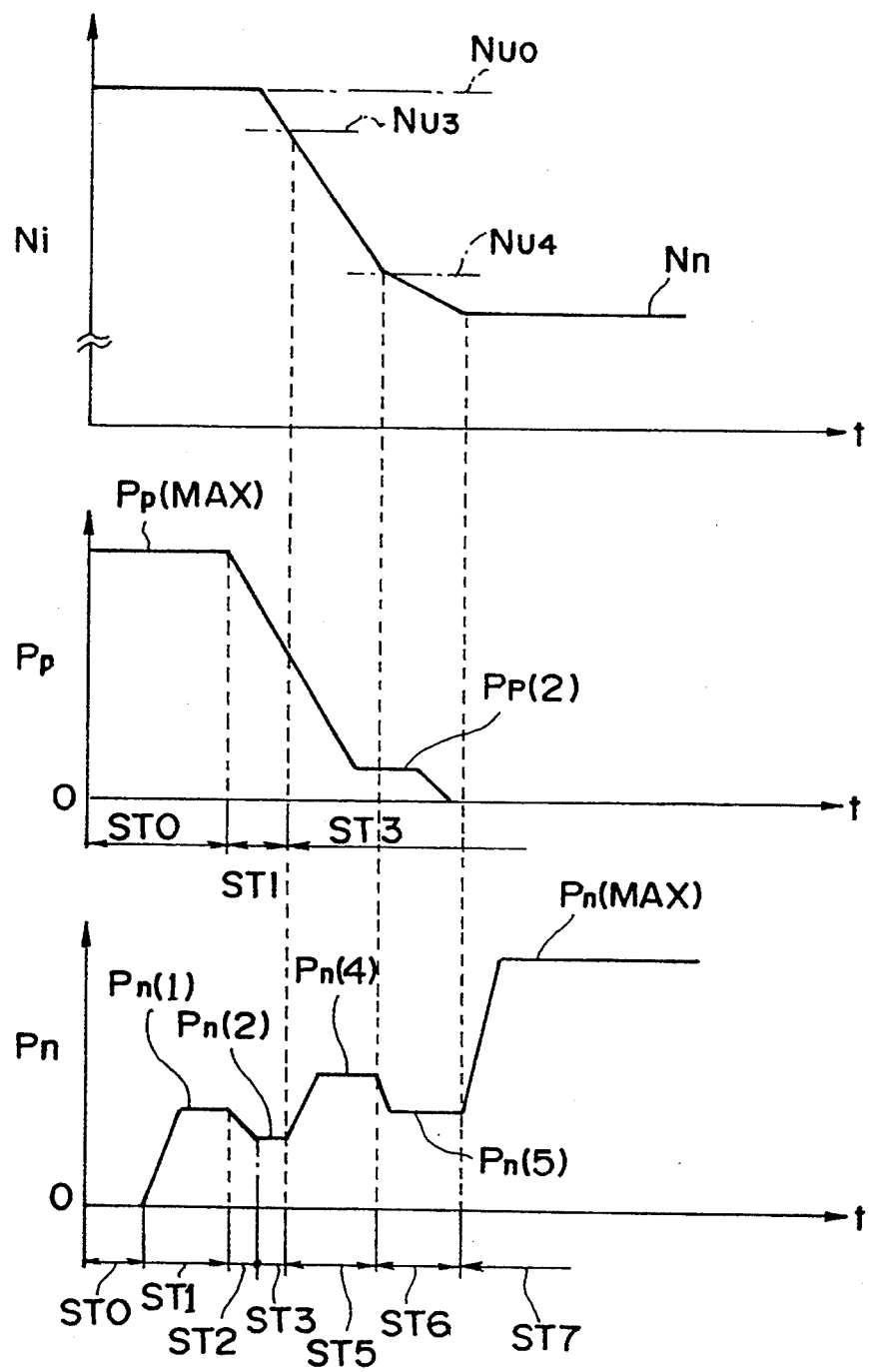
FIG. 12 is a graph showing the rotational speed of the input shaft of the transmission, the working oil pressure applied to a previous-position engaging element, and the working oil pressure applied to a next-position engaging element as they vary with time in an engine-decelerated (power-off) upshift mode.

FIG. 12 shows the rotational speed Ni of the input shaft of the transmission, the working oil pressure Pp applied to engage a previous-position engaging element, and the working oil pressure Pn applied to engage a next-position engaging element as they vary with time in the engine-decelerated upshift mode. When an upshift command is issued, the working oil pressures Pp, Pn applied to the respective previous- and next-position engaging elements enter the stage ST0. Since the stage ST0 is a standby stage, the working oil pressures Pp, Pn remain unchanged for the period of time corresponding to the stage ST0.

After the stage ST0, the working oil pressure Pp applied to the previous-position engaging element drops at a predetermined rate in the stage ST1. The force exerted to engage the previous-position engaging element starts to be reduced. When the force exerted to engage the previous-position engaging element drops below a value corresponding to the engine torque transmitted to the transmission input shaft, the previous-position engaging element begins to slip. The input shaft rotational speed Ni which corresponds to the automobile speed at the time the previous-position engaging element is engaged is referred to as an upshift reference rotational speed NU0. Since the engine is decelerated at this time, the input shaft rotational speed Ni starts decreasing.

At the same time, the working oil pressure Pn applied to engage the next-position engaging element is also controlled. After the stage ST0, the working oil pressure Pn is set to an oil pressure Pn(1) required to reduce the clearance in the next-position engaging element in the stage ST1. Upon application of the oil pressure Pn(1), a piston of the next-position engaging element is moved a distance corresponding to the clearance of a friction plate or the like, so that the next-position engaging element is readied for immediate engagement. If the oil pressure Pn(1) is so high at this time that the next-position engaging element will start to be engaged, both the previous- and next-position engaging elements would be engaged, thus lowering the input shaft rotational speed Ni. In the event that the oil pressure Pn(1) is too high, therefore, the control process enters the stage ST2 to slightly lower the oil pressure Pn, and the oil pressure Pn is set to an oil pressure Pn(2) to reduce the clearance in the stage ST3.

When the input shaft rotational speed Ni drops to a third upshift target rotational speed NU3 which is lower than the upshift reference rotational speed NU0 by a third predetermined rotational speed of 20 RPM, the control process enters the stage ST5 in which the working oil pressure applied to engage the next-position engaging element is increased up to an oil pressure Pn(4) required to engage the next-position engaging element to a certain extent.

Simultaneously, the working oil pressure Pp applied to engage the previous-position engaging element is lowered to a minimum level in the stage ST3.

The input shaft rotational speed Ni continuously falls. When the input shaft rotational speed Ni falls to a rotational speed NU4 that is a predetermined rotational speed of 30 RPM higher than a rotational speed Nn corresponding to the automobile speed at the time the next-position engaging element is engaged, the control process enters the stage ST6 in which the working oil pressure Pn applied to engage the next-position engaging element is slightly reduced to an oil pressure Pn(5), thus reducing the rate at which the input shaft rotational speed Ni falls. In this manner, the engagement of the next-position engaging element is smoothly completed.

When the input shaft rotational speed Ni coincides with the rotational speed Nn, the working oil pressure applied to the next-position engaging element is increased up to a maximum oil pressure Pn(MAX). Now, the engine-decelerated upshift mode is ended.

In the engine-decelerated upshift mode, the stage ST2 for controlling the previous-position engaging element and the stage ST4 for controlling the next-position engaging element in Table 3 are not employed, and the other stages are selected to control the engaging elements. The selected stages in Table 3 are executed in numerical order in combinations that are allowed for simultaneous execution as indicated by the mark O in Table 4.

Figure 13:
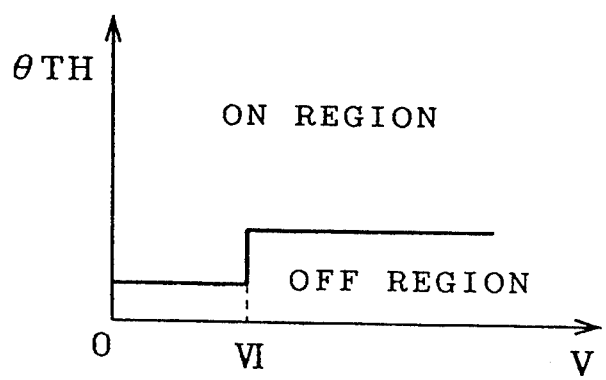
FIG. 13 is a graph showing a map of throttle openings and vehicle speeds for determining whether the engine is accelerated (power-on) or decelerated (power-off)

Inasmuch as the different control processes are carried out in the engine-accelerated and -decelerated upshift modes, the shift controller 200 determines whether the speed change or shift is to be carried out in the engine-accelerated upshift mode or the engine-decelerated upshift mode in the step S2 (see FIG. 6), by detecting the throttle opening $\theta$TH and the automobile speed V and determining the point represented by the detected throttle opening $\theta$TH and automobile speed V is in an ON region or an OFF region shown in FIG. 13.

Figure 14:
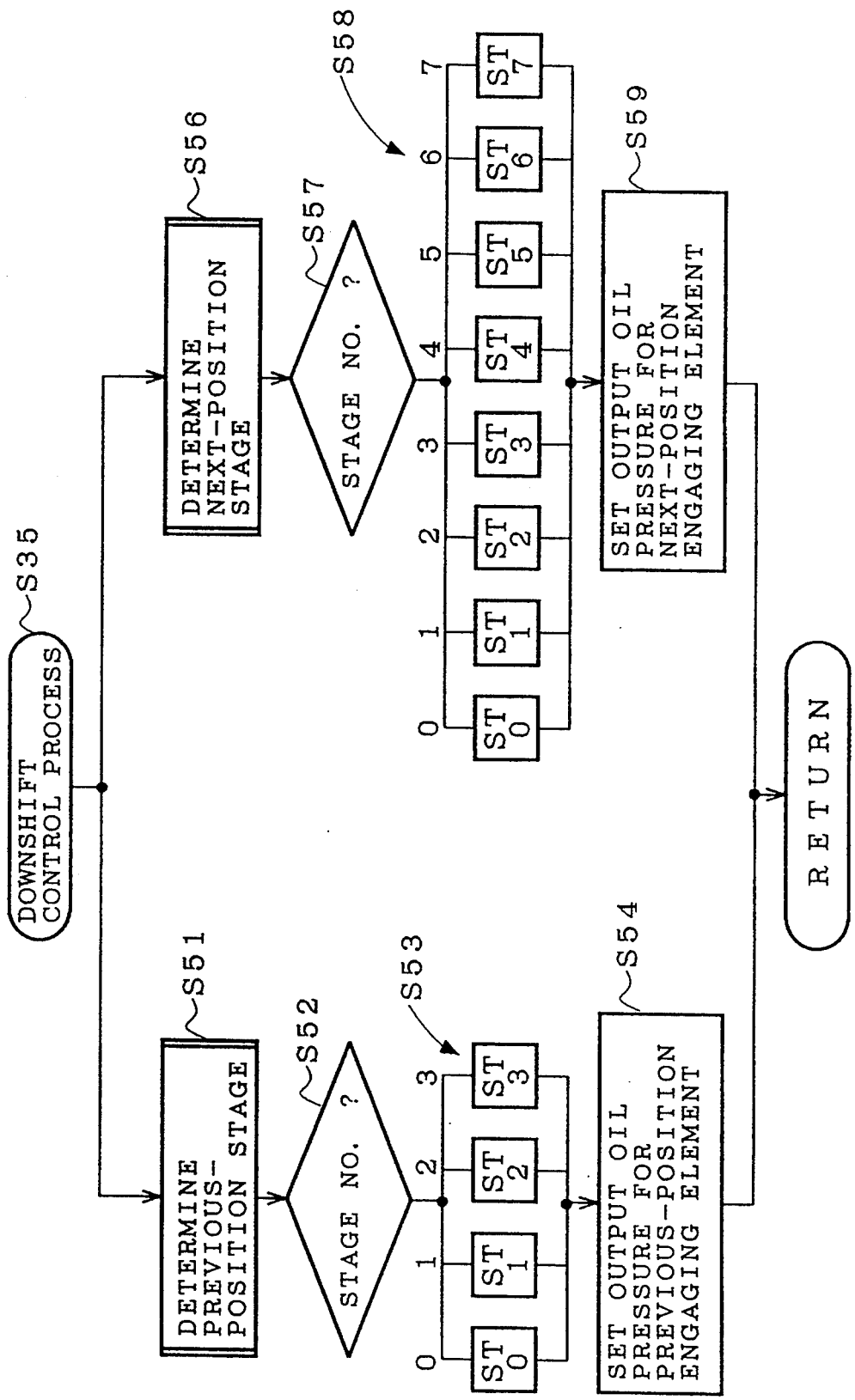
FIG. 14 is a flowchart of a downshift control process of the speed change control sequence shown in FIG. 6.

The downshift control process in the step S5 will be described below with reference to FIG. 14.

A downshift is performed also by disengaging a previous-position engaging element and engaging a next-position engaging element. In the downshift control process, a previous-position engaging element is disengaged and a next-position engaging element is engaged concurrently. For such concurrent control, the shift controller 200 determines a stage for disengaging the previous-position engaging element in a step S51, and also determines a stage for engaging the next-position engaging element in a step S56. Depending on the numbers of the stages determined for disengaging the previous-position engaging element and engaging the next-position engaging element, the shift controller 200 sets output oil pressures for the respective stages thereby to set an output oil pressure for disengaging the previous-position engaging element and also an output oil pressure for engaging the next-position engaging element in steps S52, S53, S54, S57, S58, S59.

The stages are shown in Tables 5 and 6 given below.

TABLE 5

| | Stages for the previous-position engaging element | Stages for the next-position engaging element |
| --- | --- | --- |
| ST0 | Standby (max. oil pressure) | Standby (min. oil pressure) |
| ST1 | Torque reduced (oil pressure lowered) | Clearance reduced |
| ST2 | Acceleration controlled | Clearance maintained |
| ST3 | OWC controlled | Torque increased (oil pressure increased) |
| ST4 | Disengaged (min. oil pressure) | Engaged (max. oil pressure) |

TABLE 6

| | Previous | | | | |
| --- | --- | --- | --- | --- | --- |
| Next | 0 | 1 | 2 | 3 | 4 |
| ST0 | O | O | X | X | X |
| ST1 | O | O | O | O | X |
| ST2 | O | O | O | X | X |
| ST3 | X | X | X | O | X |
| ST4 | X | X | X | X | O |

Table 5 shows the details of the respective stages, and Table 6 shows combinations that are possible among the stages. The mark O in Table 6 indicates a combination of stages that can occur at the same time or whose execution is permitted for controlling the previous-position engaging element and the next-position engaging element, and the mark X in Table 6 indicates a combination of stages that cannot occur at the same time or whose simultaneous execution is inhibited.

Setting output oil pressures in the respective stages in an engine-accelerated (power-on) downshift mode will be described below with reference to FIG. 15.

Figure 15:
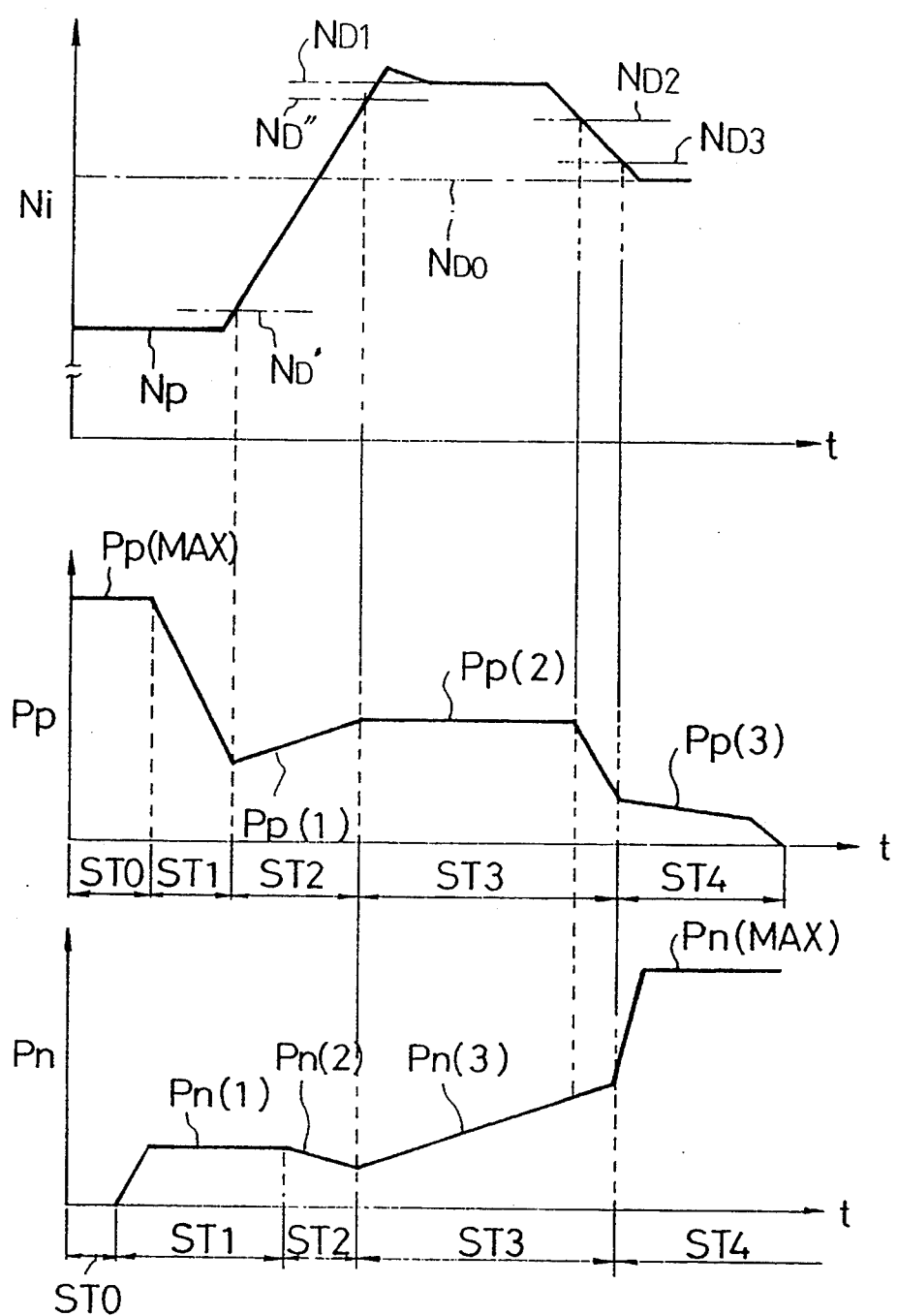
FIG. 15 is a graph showing the rotational speed of the input shaft of the transmission, the working oil pressure applied to a previous-position engaging element, and the working oil pressure applied to a next-position engaging element as they vary with time in an engine-accelerated downshift mode.

FIG. 15 shows the rotational speed Ni of the input shaft of the transmission, the working oil pressure Pp applied to engage a previous-position engaging element, and the working oil pressure Pn applied to engage a next-position engaging element as they vary with time in the engine-accelerated downshift mode. When a downshift command is issued, the working oil pressures Pp, Pn applied to the respective previous- and next-position engaging elements enter the stage ST0. Since the stage ST0 is a standby stage, the working oil pressures Pp, Pn remain unchanged for the period of time corresponding to the stage ST0.

After the stage ST0, the working oil pressure Pp applied to the previous-position engaging element drops at a predetermined rate in the stage ST1. The force exerted to engage the previous-position engaging element starts to be reduced. When the force exerted to engage the previous-position engaging element drops below a value corresponding to the engine torque transmitted to the transmission input shaft, the previous-position engaging element begins to slip.

Since the engine is accelerated at this time, the input shaft rotational speed Ni starts increasing. When the input shaft rotational speed Ni reaches a first decision value ND' which is higher than the input shaft rotational speed Np at the time of starting the speed change or shift by a predetermined rotational speed of 20 RPM, the control process enters the stage ST2 in which the force exerted to engage the previous-position engaging element is controlled to increase the input shaft rotational speed Ni at a predetermined rate. This control process is similar to the slip control process shown in FIG. 9. At this time, the working oil pressure applied to the previous-position engaging element is indicated by Pp(1) in FIG. 15.

In the downshift control process, the input shaft rotational speed Ni corresponding to the automobile speed at the time the next-position engaging element is engaged is set as a downshift reference rotational speed ND0. When the input shaft rotational speed Ni increases in the stage S2 up to a threshold value ND" which is higher than the downshift reference rotational speed ND0 by a predetermined rotational speed of 80 RPM, the control process enters the stage ST3 in which the force exerted to engage the previous-position engaging element is controlled in a feedback loop in order to equalize the input shaft rotational speed Ni with a first downshift target rotational speed ND1 that is higher than the downshift reference rotational speed ND0 by a first predetermined rotational speed of 100 RPM. Under this feedback control, the working oil pressure Pp applied to engage the previous-position engaging element is set to an oil pressure Pp(2) which fluctuates due to the feedback control though it is shown as linear in FIG. 15.

At the same time, the working oil pressure Pn applied to engage the next-position engaging element is also controlled. After the stage ST0, the working oil pressure Pn is set to an oil pressure Pn(1) required to reduce the clearance in the next-position engaging element in the stage ST1. Upon application of the oil pressure Pn(1), a piston of the next-position engaging element is moved a distance corresponding to the clearance of a friction plate or the like, so that the next-position engaging element is readied for immediate engagement. If the oil pressure Pn(1) is so high at this time that the next-position engaging element will start to be engaged, both the previous- and next-position engaging elements would be engaged, thus lowering the input shaft rotational speed Ni. In the event that the oil pressure Pn(1) is too high, therefore, the control process enters the stage ST2 to lower the oil pressure Pn as indicated by Pn(2).

At the same time that the working oil pressure applied to the previous-position engaging element enters the stage ST3, the working oil pressure applied to the next-position engaging element enters the stage ST3 in which it is increased as an oil pressure Pn(3) at a predetermined rate. During this time, the previous-position engaging element is controlled in a feedback loop in order to keep the input shaft rotational speed Ni at the first downshift target rotational speed ND1. As the oil pressure Pn(3) applied to the next-position engaging element is increased to increase the force applied to engage the next-position engaging element, the input shaft rotational speed Ni is lowered.

When the input shaft rotational speed Ni becomes lower than a second downshift target rotational speed ND2 (ND2<ND1) which is higher than the downshift reference rotational speed ND0 by a second predetermined rotational speed of 60 RPM, the working oil pressure Pp applied to engage the previous-position engaging element falls to an oil pressure Pp(3). Now, the control process enters the stage ST4. The previous-position engaging element is substantially disengaged.

The stage ST3 for controlling the previous-position engaging element is also similar to a control sequence for controlling an engaging element having a one-way clutch, and hence is referred to as a one-way clutch (OWC) control sequence. The one-way clutch control sequence is carried out as shown in FIGS. 8 through 10.

Since the next-position engaging element has started to be engaged when the previous-position engaging element is disengaged, the input shaft rotational speed Ni is continuously reduced. When the input shaft rotational speed Ni drops to a third downshift target rotational speed ND3 (ND3<ND2) which is lower than the downshift reference rotational speed ND0 by a third predetermined rotational speed of 20 RPM, the control process enters the stage ST4 in which the oil pressure applied to engage the next-position engaging element is increased up to a maximum oil pressure Pn(MAX), and the oil pressure applied to the previous-position engaging element is gradually released. In this manner, the engagement of the next-position engaging element is smoothly completed, resulting an end of the engine-accelerated downshift mode.

Figure 16:
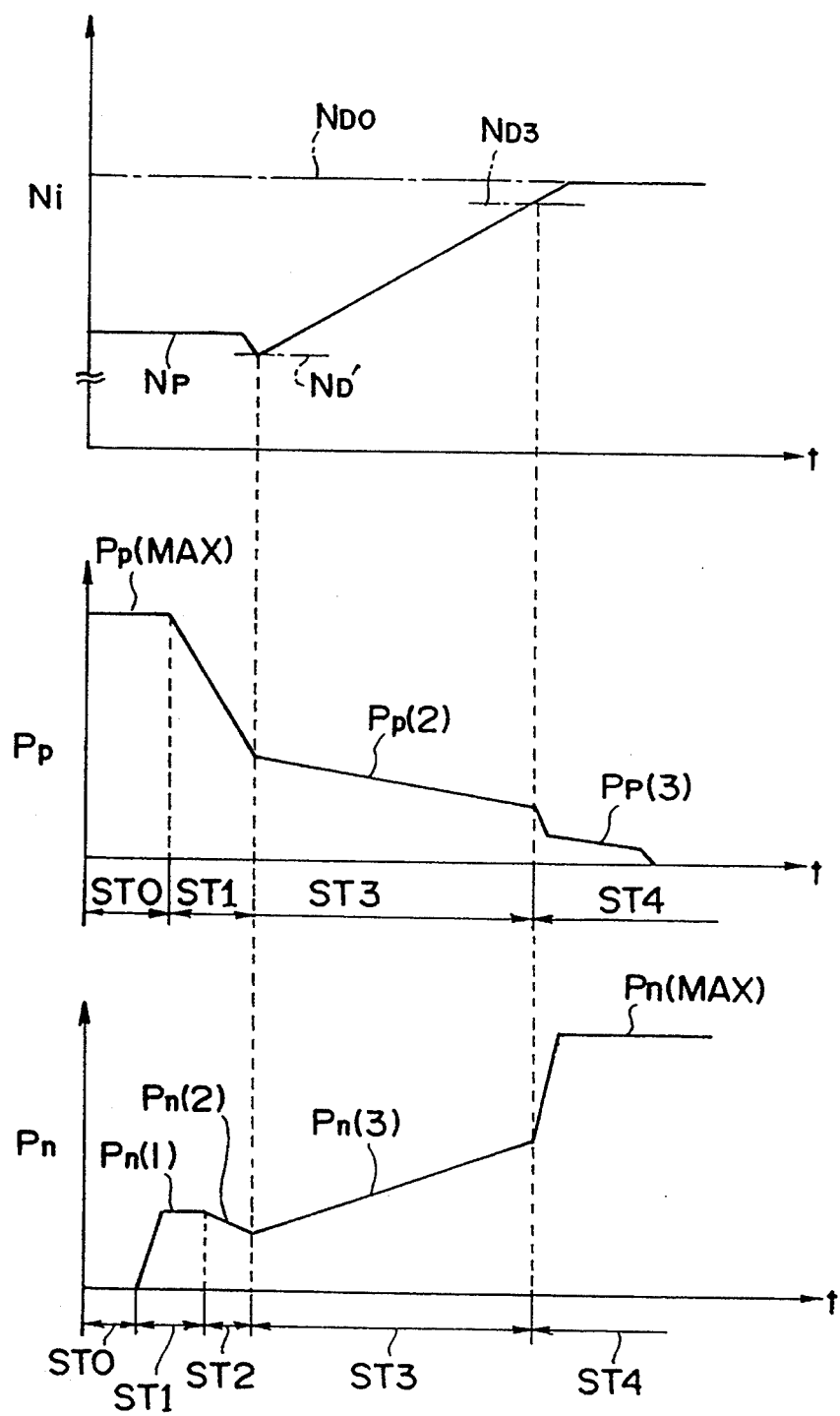
FIG. 16 is a graph showing the rotational speed of the input shaft of the transmission, the working oil pressure applied to a previous-position engaging element, and the working oil pressure applied to a next-position engaging element as they vary with time in an engine-decelerated downshift mode.

Setting output oil pressures in the respective stages in an engine-decelerated (power-off) downshift mode will be described below with reference to FIG. 16.

After the stage ST0, the working oil pressure Pp applied to the previous-position engaging element drops at a predetermined rate in the stage ST1. The force exerted to engage the previous-position engaging element starts to be reduced. When the force exerted to engage the previous-position engaging element drops below a value corresponding to the engine torque transmitted to the transmission input shaft, the previous-position engaging element begins to slip.

Since the engine is decelerated at this time, the input shaft rotational speed Ni starts decreasing. When the input shaft rotational speed Ni reaches a first decision value ND' which is lower than the input shaft rotational speed Np at the time of starting the speed change or shift by a predetermined rotational speed of 20 RPM, the control process enters the stage ST3 in which the force exerted to engage the previous-position engaging element is controlled to increase the input shaft rotational speed Ni at a predetermined rate.

In the downshift control process, the input shaft rotational speed Ni corresponding to the automobile speed at the time the next-position engaging element is engaged is set as a downshift reference rotational speed ND0.

At the same time, the working oil pressure Pn applied to engage the next-position engaging element is also controlled. After the stage ST0, the working oil pressure Pn is set to an oil pressure Pn(1) required to reduce the clearance in the next-position engaging element in the stage ST1. Upon application of the oil pressure Pn(1), a piston of the next-position engaging element is moved a distance corresponding to the clearance of a friction plate or the like, so that the next-position engaging element is readied for immediate engagement. If the oil pressure Pn(1) is so high at this time that the next-position engaging element will start to be engaged, both the previous- and next-position engaging elements would be engaged, thus lowering the input shaft rotational speed Ni. In the event that the oil pressure Pn(1) is too high, therefore, the control process enters the stage ST2 to lower the oil pressure Pn as indicated by Pn(2) in FIG. 16.

At the same time that the control process for the previous-position engaging element enters the stage ST3, the control process for the next-position engaging element also enters the stage ST3, increasing the oil pressure Pn applied to the next-position engaging element at a predetermined rate as indicated by Pn(3). During this time, therefore, the forces applied to engage the previous- and next-position engaging elements are controlled in a feedback loop to increase the input shaft rotational speed Ni at a predetermined rate.

When the input shaft rotational speed Ni becomes higher than the third downshift target rotational speed ND3 which is higher than the downshift reference rotational speed ND0 by the third predetermined rotational speed of 20 RPM, the working oil pressure Pp applied to engage the previous-position engaging element falls to an oil pressure Pp(3). Now, the control process enters the stage ST4. The previous-position engaging element is substantially disengaged.

The stage ST3 for controlling the previous-position engaging element is also similar to a control sequence for controlling an engaging element having a one-way clutch, and hence is referred to as a one-way clutch (OWC) control sequence. The one-way clutch control sequence will now be described below with reference to FIGS. 8 through 10.

Concurrent with this, the oil pressure Pn applied to engage the next-position engaging element enters the stage ST4 in which the oil pressure applied to engage the next-position engaging element is increased up to a maximum oil pressure Pn(MAX). In this manner, the engagement of the next-position engaging element is smoothly completed, resulting an end of the engine-decelerated downshift mode.

Although a certain preferred embodiment of the present invention has been shown and described in detail, it should be understood that various changes and modifications may be made therein without departing from the scope of the appended claims.

What is claimed is:

1. An apparatus for controlling an automatic transmission, comprising:
   a plurality of power transmitting paths disposed between an input and an output shafts of said automatic transmission for establishing respective gear positions; a plurality of engaging elements for selecting one of said power transmitting paths at a time; and engaging control means for controlling forces applied to engage the engaging elements;
   said engaging control means comprising means for disengaging a previous-position engaging element of said engaging elements based on a plurality of previous-position stages and engaging a next-position engaging element thereof based on a plurality of next-position stages to execute an upshift of the automatic transmission;

said plurality of previous-position stages in said upshift comprising a standby stage (ST0) for waiting with a maximum controlling force of the previous-position engaging element, a first stage (ST1) for reducing the controlling force of the previous-position engaging element at a predetermined rate, a second stage (ST2) for controlling the controlling force of the previous-position engaging element in a feedback loop to equalize the input speed with a target speed, and a third stage (ST3) for releasing the controlling force of the previous-position engaging element; and said plurality of next-position stage in said upshift comprising a standby stage (ST0') for waiting with a minimum controlling force of the next position engaging element, a first stage (ST1') for setting the controlling force of the next position engaging element at a level required to reduce a play in the next position engaging element, a second stage (ST2') for lowering the controlling force of the next position engaging element slightly, a third stage (ST3') for keeping the slightly lowered force of the next position engaging element, a fourth stage (ST4') for gradually increasing the controlling force of the next position engaging element, a fifth stage (ST5') for keeping the increased controlling force of the net position engaging element, a sixth stage (ST6') for keeping the controlling force of the next position engaging element at a level lowered by a specified value, and a seventh stage (ST7') for increasing the controlling force of the next position engaging element to a maximum;

wherein only said standby stage (ST0'), said first stage (ST1'), said second stage (ST2') and said third stage (ST3') of said next-position stages are allowed to execute under said standby stage (ST0) and said first stage (ST1) of said previous-position stages in said upshift, only said first stage (ST1') and said fourth stage (ST4') of said next-position stages are allowed to execute under said second stage (ST2) of said previous-position stages in said upshift, and only said fifth stage (ST5'), said sixth stage and said seventh stage (ST7') of said next-position stages are allowed under said third stage (ST3) of said previous position stages in said upshift.

2. An apparatus according to claim 1, wherein said engaging control means controls to execute the upshift under a power-on condition;
said plurality of previous-position stages comprise the standby stage (ST0), and the first to third stages (ST1, ST2, ST3); and
said plurality of next-position stages comprise the standby stage (ST0'), and the first to seventh stages (ST1', ST2', ... ST7').

3. An apparatus according to claim 1, wherein said engaging control means controls to execute the upshift under a power-off condition;
said plurality of previous-position stages comprise the standby stage (ST0), the first stage (ST1) and the third stage (ST3); and
said plurality of next-position stages comprise the standby stage (ST0'), the first stage (ST1'), the second stage (ST2'), the third stage (ST3'), the fifth stage (ST5'), the sixth stage (ST6') and the seventh stage (ST7').

4. An apparatus according to claim 1, wherein said engaging control means controls pressures applied to engage the engaging elements;
said plurality of previous-position stages in said upshift comprises the standby stage (ST0) for waiting with a maximum pressure of the previous-position engaging element, the first stage (ST1) for reducing the pressure of the previous-position engaging element at a predetermined rate after elapse of a predetermined period of time, and the second stage (ST2) executed when the input speed reaches a threshold value (NU1') which is higher than an upshift reference speed (NU0) corresponding to the output speed, said second stage including means for controlling the pressure applied to engage said previous-position engaging element through a feedback loop to equalize the input speed with a first upshift target speed (NU1) which is higher than said threshold value (NU1'); and
said plurality of next-position stages in said upshift comprises the standby stage (ST0') for waiting with a minimum pressure of the next-position engaging element, the first to third stages (ST1', ST2', ST3') for keeping the pressure ready for immediately engaging said next-position engaging element, and the fourth stage (ST4') executed when the input speed reaches the threshold value (NU1'), said fourth stage (ST4') including means for gradually increasing the pressure applied to engage said next-position engaging element.

5. An apparatus according to claim 4, wherein said engaging control means controls to execute the upshift under a power-on condition;
said plurality of previous-position stages further comprises the third stage (ST3) for lowering the pressure applied to said previous-position engaging element when the input speed becomes equal to or lower than a second upshift target speed (NU2) which is higher than said upshift reference speed (NU0) and lower than said first upshift target speed (NU1); and
said plurality of next-position stages further comprises the fourth and fifth stages (ST4', ST5') for controlling the pressure applied to engage said next-position engaging element when the input speed becomes equal to or lower than said second upshift target speed (NU2).

6. An apparatus according to claim 5, wherein said engaging control means comprises means for gradually increasing the pressure applied to engage said next-position engaging element after the input speed becomes equal to or lower than said second upshift target speed (NU2) until the input speed reaches a third upshift target speed (NU3) which is lower than said upshift reference speed (NU0) by a predetermined speed, and thereafter controlling the pressure applied to engage said next-position engaging element to keep the pressure at a level when the input speed reaches said third upshift target speed (NU3).

7. An apparatus for controlling an automatic transmission, comprising:
a plurality of power transmitting paths disposed between an input and an output shafts of said automatic transmission for establishing respective gear positions; a plurality of engaging elements for selecting one of said power transmitting paths at a time; and engaging control means for controlling forces applied to engage the engaging elements;

said engaging control means comprising means for disengaging a previous-position engaging element of said engaging elements based on a plurality of previous-position stages and engaging a next-position engaging element thereof based on a plurality of next-position stages to execute a downshift in the automatic transmission;

said plurality of previous-position stages in said downshift comprising a standby stage (ST0) for waiting with a maximum controlling force of the previous-position engaging element, a first stage (ST1) for reducing the controlling force of the previous-position engaging element at a predetermined rate, a second stage (ST2) for controlling the controlling force of the previous-position engaging element to increase the input speed at a specified rate, a third stage (ST3) for controlling the controlling force of the previous-position engaging element in a feedback loop to equalize the input speed with a target speed, and a fourth stage (ST4) for releasing the controlling force of the previous-position engaging element; and said plurality of next-position stages in said downshift comprising a standby stage (ST0') for waiting with a minimum controlling force of the next position engaging element, a first stage (ST1') for setting the controlling force of the next position engaging element at a level required to reduce a play in the next position engaging element, a second stage (ST2') for keeping the controlling force of the next position engaging element, a third stage (ST3') for gradually increasing the controlling force of the next position engaging element, and a fourth stage (ST4') for increasing the controlling force of the next position engaging element to a maximum;

wherein only said standby stage (ST0'), a said first stage (ST1') and said second stage (ST2') of said next-position stages are allowed to execute under said standby stage (ST0) and said first stage (ST1) of said previous-position stages in said downshift, only said first stage (ST1') and said second stage (ST2') of said next-position stages are allowed to execute under said second stage (ST2) of said previous-position stages in said downshift, only said first stage (ST1') and said third stage (ST3') of said next-position stages are allowed to execute under said third stage (ST3) of said previous-position stages in said downshift, and only said fourth stage (ST4'), of said next-position stages ia allowed under said fourth stage (ST4) of said previous-position stages in said downshift.

8. An apparatus according to claim 7, wherein said engaging control means controls to execute the downshift under a power-on condition;

said plurality of previous-position stages comprise the standby stage (ST0), and the first to fourth stages (ST1, ST2, ST4); and said plurality of next-position stages comprise the standby stage (ST0), and the first to fourth stages (ST1', ST2', ST3', ST4').

9. An apparatus according to claim 7, wherein said engaging control means controls to execute the downshift under a power-of condition;

said plurality of previous-position stages comprise the standby stage (ST0), the first stage (ST1), the third stage (ST3), and the fourth stage (ST4); and said plurality of next-position stages comprise the standby stage (ST0'), the first to fourth stages (ST1', ST2', ST3', ST4').

10. An apparatus according to claim 8, wherein said third stage (ST3) of said previous-position stages is executed to control a force applied to engage said previous-position engaging element to equalize the input speed with a first downshift target speed (ND1) higher than a downshift reference speed (ND0) corresponding to the output speed, said third stage (ST3') of said next-position stages is simultaneously executed to gradually increase the force applied to engage said next-position engaging element, then, the force applied to said previous-position engaging element is lowered under said third stage (ST3) of said previous-position stages when the rotational speed of said input shaft becomes equal to or lower than a second downshift target speed ND2 which is higher than said downshift reference speed (ND0) and lower than said first downshift target speed (ND1), and said fourth stage (ST4) of said previous-position stages and said fourth stage (ST4') of said next-position stages are executed when the input speed becomes equal to or lower than a third downshift target speed (ND3) which is higher than said downshift reference speed ND0 and lower than said second downshift target speed (ND2), to minimize the force applied to engage said previous-position engaging element and maximize the force applied to engage said next-position engaging element.

11. An apparatus according to claim 9, wherein said third stages (ST3, ST3') of said previous-position stages and said next-position stages begin simultaneously when the input speed becomes equal to or lower than a first downshift target speed (ND'), under said third stage (ST3) of said previous-position stages, the force applied to engage said previous-position engaging element being controlled so as to increase the input speed at a predetermined rate, under said third stage (ST3') of said next-position stages, the force applied to engage said next-position engaging element being increased at a specified rate, and said fourth stages (ST4, ST4') of said previous-position stages and said next-position stages begin simultaneously when the input speed becomes equal to the second shiftdown target speed (ND3).

* * * * *